United States Patent
Mao et al.

(10) Patent No.: US 12,020,265 B1
(45) Date of Patent: Jun. 25, 2024

(54) SYSTEMS AND METHODS FOR DISCOVERING ONLINE INFLUENCERS AND GENERATING MARKET SENTIMENT INDEX

(71) Applicant: Wissee, Inc., Sammamish, WA (US)

(72) Inventors: Huina Mao, Sammamish, WA (US); Xin Shuai, Sammamish, WA (US)

(73) Assignee: Wissee, Inc., Sammamish, WA (US)

(*) Notice: Subject to any disclaimer, the term of this patent is extended or adjusted under 35 U.S.C. 154(b) by 13 days.

(21) Appl. No.: 17/374,187

(22) Filed: Jul. 13, 2021

Related U.S. Application Data

(60) Provisional application No. 63/052,035, filed on Jul. 15, 2020.

(51) Int. Cl.
G06Q 30/0201 (2023.01)
G06F 40/30 (2020.01)
G06Q 30/0242 (2023.01)

(52) U.S. Cl.
CPC ......... G06Q 30/0201 (2013.01); G06F 40/30 (2020.01); G06Q 30/0243 (2013.01)

(58) Field of Classification Search
CPC . G06Q 30/0201; G06Q 30/0243; G06F 40/30
See application file for complete search history.

(56) References Cited

U.S. PATENT DOCUMENTS

| | | | | |
|---|---|---|---|---|
| 2009/0240574 A1* | 9/2009 | Carpenter | ............ | G06Q 40/06 705/36 R |
| 2012/0209920 A1* | 8/2012 | Neystadt | ............ | G06Q 30/0201 707/723 |
| 2013/0103667 A1* | 4/2013 | Minh | ............ | H04L 51/02 707/730 |
| 2014/0317126 A1* | 10/2014 | Work | ............ | H04L 51/52 707/748 |
| 2015/0120717 A1* | 4/2015 | Kim | ............ | G06F 16/335 707/727 |
| 2018/0150870 A1* | 5/2018 | Haaland | ............ | G06Q 30/0277 |
| 2019/0188588 A1* | 6/2019 | Yang | ............ | G06N 20/00 |
| 2019/0219187 A1* | 7/2019 | Kunberger | ............ | F16K 31/025 |
| 2019/0340688 A1* | 11/2019 | Jezewski | ............ | G06Q 30/0201 |
| 2021/0150541 A1* | 5/2021 | Gurbuxani | ............ | G06N 20/10 |

OTHER PUBLICATIONS

"Discovering opinion leaders for medical topics using news articles" Siddhartha Jonnalagadda, Ryan Peeler and Philip Topham (Year: 2012).*

* cited by examiner

*Primary Examiner* — Alexandru Cirnu
(74) *Attorney, Agent, or Firm* — Princeton IP Law LLC

(57) ABSTRACT

Systems, apparatuses, and methods obtain and process data that may be used to identify or discover one or more "influencers" in business, finance, fashion, sports, current events, and other areas, and also to generate an indication of each influencer's expertise and ability to influence others with their posts or comments. A measure of each influencer's accuracy with regards to the contents of their previous comments or posts may also be generated. Based on determining the sentiment associated with each influencer's current posts or comments, an index or measure of the accuracy weighted sentiment expressed by a set of influencers with regards to an event, stock, trend, or other aspect may be generated and presented to a user to assist them in making a decision.

17 Claims, 12 Drawing Sheets

2. Trending Topics Word Cloud

4. Top Messages

1. Financial Influencers Confidence Index Trend

3. Top Influencers

SYSTEMS AND METHODS FOR DISCOVERING ONLINE INFLUENCERS AND GENERATING MARKET SENTIMENT INDEX

CROSS REFERENCE TO RELATED APPLICATIONS

This application claims the benefit of U.S. Provisional Application No. 63/052,035, entitled "Systems and Methods for Discovering Online Financial Market Influencers and Generating Indicator of Market Confidence," filed Jul. 15, 2020, the disclosure of which is incorporated, in its entirety, by this reference.

BACKGROUND

Online information grows exponentially, and with that growth, it becomes more difficult to interpret and evaluate. In addition to traditional sources of information such as investment advisors (both human and semi- or fully automated) or friends/acquaintances, investors may rely on other sources of online information when making investment decisions. This online information may include various online "experts" and their opinions, news, financial services providers, marketers, and forms of social media analytics, etc. Online channels (such as social media, blogs, forums, news media) provide a rich amount of information in a large-scale and real-time manner. While this information may be helpful and, in some cases accurate, there is typically far too much data for an investor to absorb and understand, and no way to effectively evaluate how reliable the data is. As a result, Investors are often at a disadvantage to insiders and those who have the time and resources to access and evaluate authoritative expert opinions and more fully analyze financial data.

Investors rely on these sources of information when determining whether to buy a stock, sell a stock they own, or engage in one of many other forms of investing or managing their finances (including refinancing a home, investing in a rental property, leasing or renting instead of buying a car or home, etc.). As noted, these sources of information include investment advisors, various forms of analytics, opinions of "experts", suggestions or "tips" from friends and acquaintances, etc. Typically, an investor will rely on what friends, family or so-called online financial "experts" tell them is a good source or on the "popularity" of a source, which they hope is strongly correlated with the value of the information the source provides. However, this is often not the case over time and since both making an investment decision and the timing of the decision being executed can be important factors, investors are often at a disadvantage. While popularity or recognizability may be related to the exposure an "expert" receives, it does not necessarily predict their accuracy or reliability regarding the advice they provide (especially in the short term before enough people have followed their advice and provide feedback on their accuracy and reliability).

The combination of multiple, rapidly changing sources of online information and uncertainty as to the reliability of those sources leaves most investors at a disadvantage and in many cases, unable to effectively manage their investments. Embodiments of the systems, apparatuses, and methods described herein address those problems and disadvantages, both individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

As used herein, the terms "Financial Market Influencers," "Financial Influencers," "Potential Influencer", "Influencer", or "Influencers" may refer to an industry leader, businessperson, opinion maker, market influencer, notable personality, self-proclaimed expert, "recognized" expert, etc. The person may serve as an opinion leader, commentator, influencer, pundit, or otherwise have some impact in the area of financial information, business practices, trends, behaviors, products, or services (or in the case of non-financial related posts or comments, in an area or aspect of a trend, fashion, product, behavior, or service of interest to a user).

In some embodiments, the systems, apparatuses, and methods obtain and process data that may be used to identify or discover one or more "influencers" in business, finance, fashion, sports, current events, and other areas, and also to generate an indication of each influencer's expertise and ability to influence others with their posts or comments. A measure of each influencer's accuracy with regards to the contents of their previous comments or posts may also be generated. Based on determining the sentiment associated with each influencer's current posts or comments, an index or measure of the accuracy weighted sentiment expressed by a set of influencers with regards to an event, stock, trend, or other aspect may be generated. This index may then be presented to a user in the form of a user interface that comprises one or more displays of index values, trends, key influencers, key posts or comments, etc.

In some embodiments, the systems, apparatuses, and methods assist a user to discover the identity of the primary influencers in the area of financial information, products, and services (as examples), and their sentiment(s) regarding an aspect of the financial environment (such as a stock, company, or market direction). In some embodiments, the system generates a score and/or ranking for each influencer or potential influencer to determine a set of "top" influencers based on one or more metrics. In some embodiments, the score and/or ranking for each influencer or potential influencer is based (at least in part) on their expertise and ability to influence others. The scoring or ranking may be performed with the assistance of one or more trained models and/or other scoring techniques.

A measure of each top influencer's accuracy with regards to the contents of their previous comments or posts may also be generated. The accuracy may be determined over one or more timeframes (such as short-term, medium, and longer term). The influencer's accuracy may be combined with a measure of the sentiment associated with each of an influencer's current comments or posts to determine an accuracy weighted sentiment value for each of the comments or posts.

This value for each of the current comments or posts may be combined to generate an overall confidence index for that influencer. The overall confidence index for each of a set of top influencers may be combined to produce an overall metric or index representing the sentiment of the set of influencers regarding the expected behavior (typically expressed as a degree of positivity or negativity) of the aspect of the financial environment or other subject. The overall confidence index may be used by others as guidance for the expected behavior of the aspect of the financial environment or subject, and for the expected behavior of those the influencers are able to influence.

In some embodiments, instead of the accuracy measure, the scoring or ranking for each of a set of influencers based (at least in part) on their expertise and ability to influence others may be combined with a measure of each influencer's sentiment as expressed in their comments or posts. This approach may be more feasible in situations where there is not sufficient data to reliably determine the accuracy of an influencer's comments or posts within a desired timeframe.

In some embodiments, the disclosure is directed to a system that comprises a set of computer-executable instructions and an electronic processor or processors. When executed, the instructions cause the processor or processors (or a system, apparatus, server, etc. in which the processor(s) are contained) to implement a set of operations, functions, processors, or methods described.

In some embodiments, the disclosure is directed to a set of computer-executable instructions. When executed by an electronic processor or processors, the instructions cause the processor or processors (or a system, apparatus, server, etc. in which the processor(s) are contained) to implement a set of operations, functions, processors, or methods described.

In some embodiments, the systems, apparatuses, and methods described herein may include or implement the following data processing operations, functions, processes, steps, or stages:

- One or more steps or stages to "discover" a set of potential influencers with regards to a stock, company, industry, trend, or other behavior. The set of potential influencers may then be evaluated by a scoring process to determine those having both indicia of expertise and an ability to influence others. The score or scores for each potential influencer may be combined and the resulting scores ranked to identify a set of "top" influencers;
    - Note that an influencer with regards to financial information, a product, a service, a trend, or other area is an entity (a person or source) that is able to cause others to act on their comments or posts. This can result in a person purchasing a stock, making an investment, buying a product, adopting a trend, etc. Because influencers are regarded as decision makers, opinion leaders, or trend setters, their comments affect the attitude and decisions of their audiences. Therefore, an influencer's outlook or opinions may provide early insights into possible market trends and consumer behaviors;
    - In some embodiments, the scoring and/or ranking are based on the influencer's expertise and ability to influence others (in one embodiment, as evidenced by their social network connections and responses of others to their comments or posts);
- A step or stage to evaluate the accuracy or "predictive" performance of each of the top influencers with regards to their (previous) comments or posts;
    - This may be determined over several timeframes and is indicative of whether a particular influencer's comments or posts during that timeframe were accurate in the sense of "predicting" the movement of a stock, company, market, trend, etc.;
    - In some embodiments, this accuracy measure is used to weight the sentiment associated with each of an influencer's comments or posts as part of a process to determine an overall confidence index or measure for that influencer with regards to a specific stock, industry, trend, etc.;
    - In some embodiments, determining the accuracy measure may be optional or not feasible due to a lack of sufficient data;
        - in those cases, the expertise-weighted influencer score (based on expertise and ability to influence or effectiveness at influencing others) may instead be used as a weighting measure for the sentiment associated with one or more of the influencer's previous or current comments or posts;
- A step or stage that obtains and processes training data and related labels to generate a trained sentiment analysis model for financial (or other subjects of) posts or comments;
    - In some embodiments, the annotation or labelling may be accomplished, at least in part, by identifying a proxy for the impact of an influencer's opinion or prediction and tracking the behavior of that proxy to infer the sentiment (typically positive or negative) assumed to be associated with a potential influencer's previous post(s) or comment(s);
- A step or stage to generate an accuracy weighted sentiment score for each comment or post of a specific top influencer;
    - A step or stage to combine the accuracy weighted sentiment scores for a plurality of comments or posts by the specific top influencer to obtain an overall confidence score for the influencer;
        - Note that the accuracy may be determined over a specified time frame or within one or more timeframes;
        - The accuracy associated with a timeframe (such as near-term, medium term, longer term) may then be used to weight a comment or post depending upon the timeframe being referred to in the comment or post;
- A step or stage to generate an overall confidence score for each of a set of the top influencers and to combine those scores to generate an overall confidence index (or metric) regarding the expected behavior of the aspect or characteristic that is the subject of the influencers' comments or posts; and
- A step or stage to generate one or more displays or user interfaces and associated tools to allow a user to see and interact with visualizations of the confidence index, trends of the index, components of the index (such as primary influencers, posts or comments from specific influencers, common keywords or subjects in posts or comments, etc.).

The system generated Overall Influencer Confidence Index (or a similar type of metric) may provide several benefits and advantages. These include, but are not limited to:

- Quantifying a set of influencer's/expert's outlooks on market conditions (in general or for a specific stock, company, industry, or index). In one example embodiment, the confidence index ranges from a value of 0-100, i.e., from extremely bearish to extremely bullish sentiments regarding the stock, market, economy, company, etc.;

At an individual company level (such as in terms of stock, debt, revenue, profits, growth potential, or other forms of investment), the confidence index can provide valuable insight to potential and current investors regarding whether to buy, sell, or hold a stock or other investment; and At a macro level, the index can be useful for investors, retailers, and policy makers (among others) to understand expected economic and industry conditions, and plan or execute policies accordingly;

For example, understanding the general sentiment for a group of influencers may assist in understanding how those they influence may respond in terms of consumer spending, stock market behavior, and manufacturing demands;

In many situations, this type of index can provide more reliable insight than that of a single influencer or even an expert in the area.

Other objects and advantages of embodiments of the disclosure will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

BRIEF DESCRIPTION OF THE DRAWINGS

Embodiments in accordance with the present disclosure will be described with reference to the drawings, in which.

Note that the same numbers are used throughout the disclosure and figures to reference like components and features.

DETAILED DESCRIPTION

Figure 1:
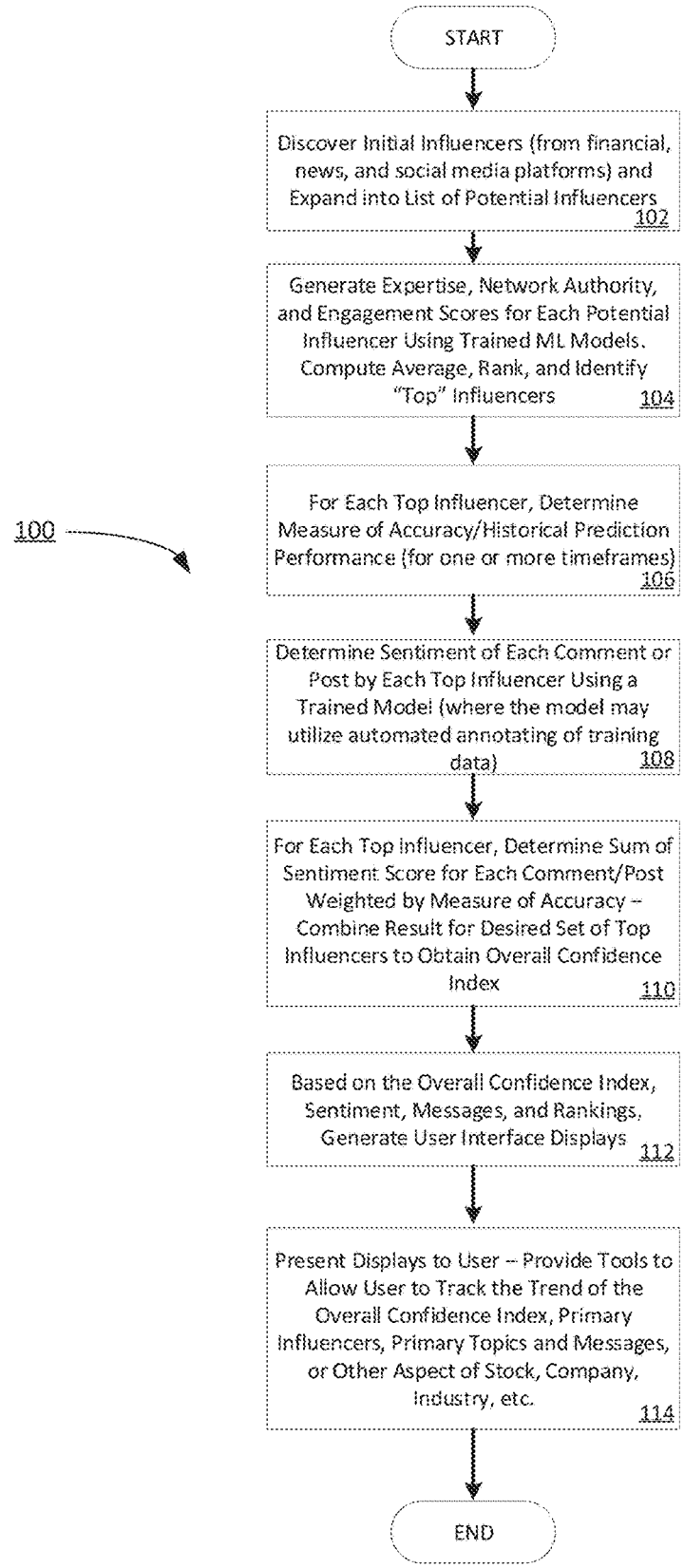
FIG. 1 is a flowchart or flow diagram illustrating a method, process, operation or function for discovering potential influencers, evaluating, scoring and ranking those influencers to determine a set of top influencers, determining the accuracy of the set of top influencers, determining a sentiment associated with the comments or posts for each of the top influencers, generating an accuracy weighted sentiment measure for a set of comments or posts for an influencer, and generating an Influencer Confidence Index representing the influencers' collective sentiment regarding a stock, the financial markets, a company or industry, the economy, or another aspect, in accordance with some embodiments.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment may be implemented in the form of an application, a sub-routine that is part of a larger application, a "plug-in", an extension to the functionality of a data processing system or platform, or other suitable form. The following detailed description is, therefore, not to be taken in a limiting sense.

Embodiments of the systems, methods, and apparatuses described herein are directed to implementations of an approach and techniques for:
  Identifying/discovering potential influencers of financial decisions (or influencers of a decision regarding a trend, event, purchase, etc.);
    These potential influencers may be sourced from one or both of traditional media sources (news, blogs, industry commentators, etc.) and social media sources (social media networks);
      In some cases, a form of named entity recognition may need to be used to properly associate a source determined from media with the correct entity responsible for the content;
  scoring and ranking each potential influencer based on their level of expertise and ability to influence others (in a sense, their effectiveness at influencing others) to determine a set of "top" influencers;
    this ranking determines the top (or most likely to be effective) influencers among a set of potential influencers by consideration of their expertise and range of influence;
  determining the accuracy (the "predictive" performance) associated with each top influencer's previous comments or posts overall and/or within a specific timeframe or timeframes;
    when available, historical data may be used to generate a measure of accuracy (t), where (t) represents a timeframe (such as near-term, medium term and longer term) during which an influencer's comments or posts had an associated accuracy (as indicated by whether the sentiment in an influencer's comment or post proved to be correct based on the movement of a stock, etc.);
  determining the sentiment associated with each current comment or post, or statement, opinion, or advice of each top influencer;
    in some embodiments, this may be determined using a trained machine learning model;
      in some embodiments, the model may be trained using a form of automated labeling or annotation based on a proxy for the expressed sentiment;
  determining an accuracy weighted sentiment value or metric for each of a plurality of comments or posts by an influencer (where the accuracy may be time dependent);
    the separate accuracy weighted sentiment values for a plurality of comments or posts may be combined, averaged, normalized, filtered or subject to other data processing to generate a score or metric for each top influencer representing that influencer's overall confidence or sentiment regarding the behavior of a stock, industry, trend, etc.;
  based on the overall confidence or sentiment score or metric for each top influencer, a set of such metrics for a selected group of influencers may then be generated and combined to form an index representing the overall sentiment of the group of influencers with regards to the behavior of a stock, financial market, situation, event, etc.;
    Because of the influence of the group of influencers and the expected behavior of others in response to their advice or comments, the index may be used as a guide to the expected short-term (and in some cases, longer term) behavior of the subject of the advice or commentary provided by the influencers; and
  the overall confidence metric for each top influencer (or a subset), the index representing the confidence level or sentiment of the set of influencers, and the underlying data regarding the content of pasts and messages, the trends in the metrics, and other relevant data may be used to generate a user interface comprising a plurality of displays, graphs, charts, tables, etc. along with user interface elements or tools to enable a user to explore and manipulate the underlying data and its trends or behaviors.

Although in some embodiments the system(s) and method(s) disclosed herein are described with reference to their use to evaluate the expertise, ability to influence others, and sentiment of each of a set of influencers in the area of financial or stock market information, with modifications, the system(s) and method(s) may be used to perform a similar set of functions and determine a confidence index in other areas or industries, and with regards to other topics.

For example, the system and methods may be used to identify influencers in the areas of health advice, food, apparel, travel, furnishings, music, popular culture trends, lifestyle, artwork, etc. In some examples, an influencer's expertise and ability to influence others can be evaluated, their accuracy with regards to being correct in "predicting" a behavior of a trend (or other item), and their sentiment with respect to an item for purchase, a style of music, a fashion or popular culture trend, etc. can be determined by a model trained with data that is annotated using a suitable proxy for the sentiment expressed in the posts or comments that are part of the data. This can be followed by generating an expertise and/or accuracy weighted sentiment score for each influencer and combining those scores to generate an index representing the confidence a set of influencers have in the future positive or negative behavior of the event, trend, present behavior, etc. Thus, for situations where there is sufficient historical data to train a sentiment model, the type of evaluation described herein can be performed for other types of influencers, trends, events, and industries.

FIG. 1 is a flowchart or flow diagram illustrating a method, process, operation or function 100 for discovering potential influencers, evaluating, scoring and ranking those influencers to determine a set of top influencers, determining the accuracy of the set of top influencers, determining a sentiment associated with the comments or posts for each of the top influencers, generating an accuracy weighted sentiment measure for a set of comments or posts for an influencer, and generating an Influencer Confidence Index representing the influencers' collective sentiment regarding a stock, the financial markets, a company or industry, the economy, or another aspect, in accordance with some embodiments. As shown in the figure, an embodiment may first discover one or more influencers initial in a specific area or with respect to a specific trend, event, item, behavior, etc. (as suggested by step or stage 102). These initial influencers may be found from both conventional media sources and social networks. An initial set of influencers may be expanded into a set of potential influencers by considering each initial influencers' social network or other source of people with whom the influencer regularly communicates.

The initial influencers and/or potential influencers are then evaluated by scoring them with regards to their expertise and ability to influence others (as suggested by step or stage 104). The influencers with the highest level of expertise-weighted effectiveness are considered the "top" influencers. The top influencers are then evaluated with regards to their historical accuracy or performance (as suggested by step or stage 106). In this step or stage, the previous comments or posts of each top influencer are examined to determine their accuracy with regards to "predicting" the behavior of a stock, etc. In some embodiments, evaluation, scoring, and/or ranking operations may be performed with the assistance of one or more trained machine learning models or other techniques.

A separate model is trained to operate to classify a post or comment with regards to its sentiment (typically expressed as being positive or negative with regards to an event, behavior, etc.), as suggested by step or stage 108. In some embodiments this classification may be a number between zero and one, with zero representing a highly negative sentiment and one representing a highly positive sentiment. In some embodiments, the training data may be automatically or semi-automatically labeled or annotated by examining a proxy or indirect indicator of sentiment. After training and evaluating the performance of the sentiment model, the posts or comments of each of the top influencers may be input to the trained model to obtain a classification of the sentiment associated with each of their posts or comments.

As mentioned, based on their expertise and ability to influence others, a score or measure may be generated for each influencer. Once a set of top or most effective influencers are found, each influencer's accuracy or performance may be determined. In some embodiments, the accuracy or performance may be based on historical data and the accuracy of an influencer's "predictions" regarding a stock, market trend, etc. In some embodiments, the accuracy or prediction performance may be determined for one or more timeframes (shorter/near term, medium term, and long term for example). An influencer's accuracy or performance score for a relevant timeframe may be multiplied by a sentiment score obtained from the trained model for an influencer's comment or post in that timeframe to obtain an accuracy weighted sentiment value for that comment or post. By summing the accuracy weighted sentiment value(s) for multiple posts by an influencer and normalizing the result, a confidence index for each of the top influencers may be obtained. This value for each top influencer may be combined (summed, averaged, normalized, etc.) to obtain an overall confidence index that represents the confidence of a set of influencers (either all of the top influencers or a subset) with regards to a stock, a company, an industry, a trend, etc., as suggested by step or stage 110.

Based on the overall confidence index (typically as a function of time over some interval of interest), one or more user interface displays may be generated to provide a user with information regarding the index, its trend(s), the primary influencers, the messages being generated by those influencers, the subject matter of those messages, etc. (as suggested by step or stage 112). The generated displays may be presented to the user on a device or using a device (such as a VR/AR device), thereby allowing the user to track the behavior of the index and the contributions to the index, among other areas of interest (as suggested by step or stage 114). The user interface or displays may be accompanied by user interface elements or tools to enable a user to explore and investigate the underlying data, trends, message contents, etc.

Figure 2A:
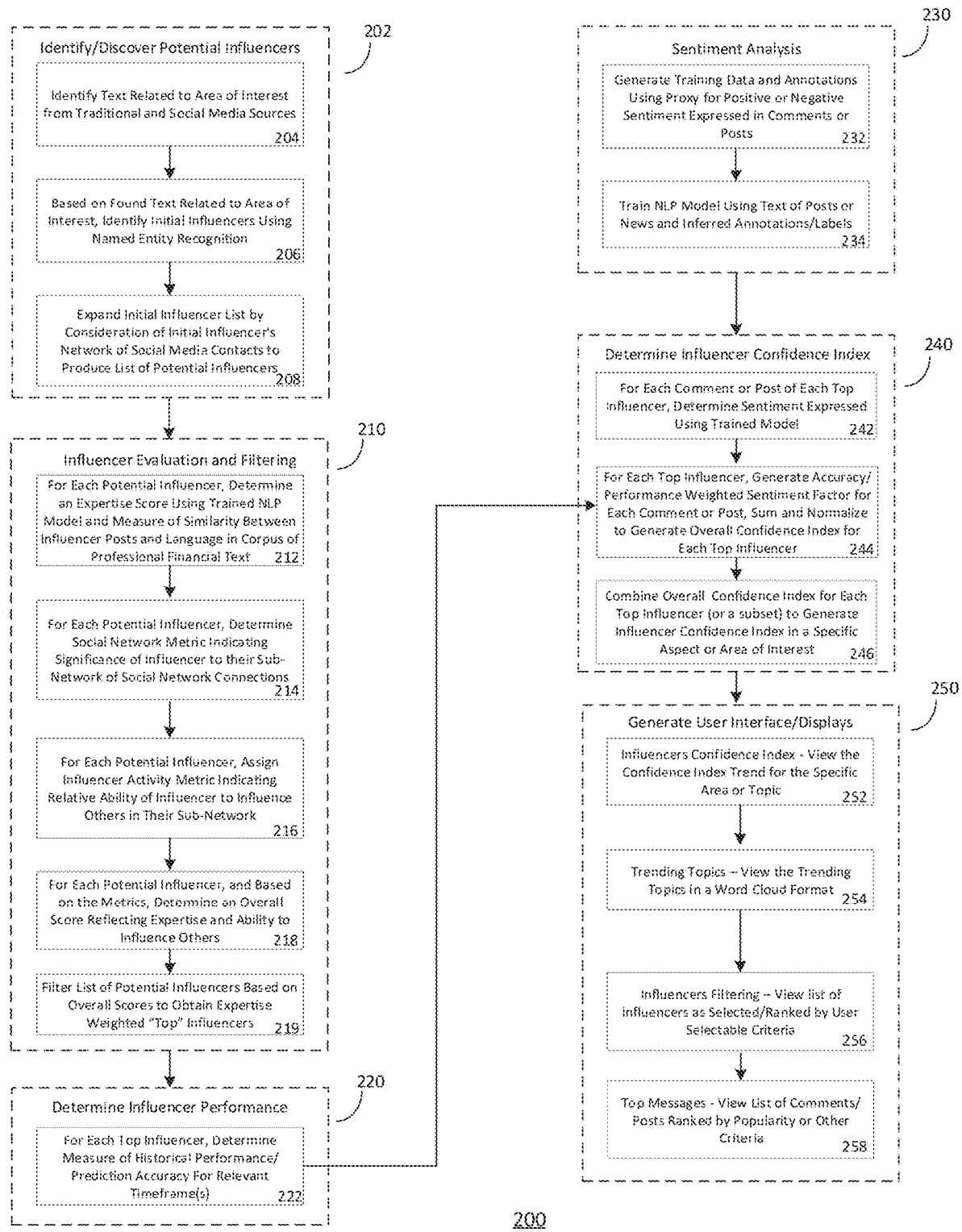
FIG. 2(a) is a flowchart or flow diagram illustrating a method, process, operation, or function for identifying or discovering one or more potential Influencers, evaluating or ranking each potential influencer with respect to their expertise and ability to influence others, determining an accuracy of the "top" influencers, determining a sentiment regarding a topic as expressed in a comment or post by each of the top influencers, generating an accuracy weighted sentiment measure for a set of comments or posts made by each of the top influencers (or a subset), and generating an indication of the overall confidence the set of top influencers have regarding the topic, in accordance with some embodiments.
Figure 2B:
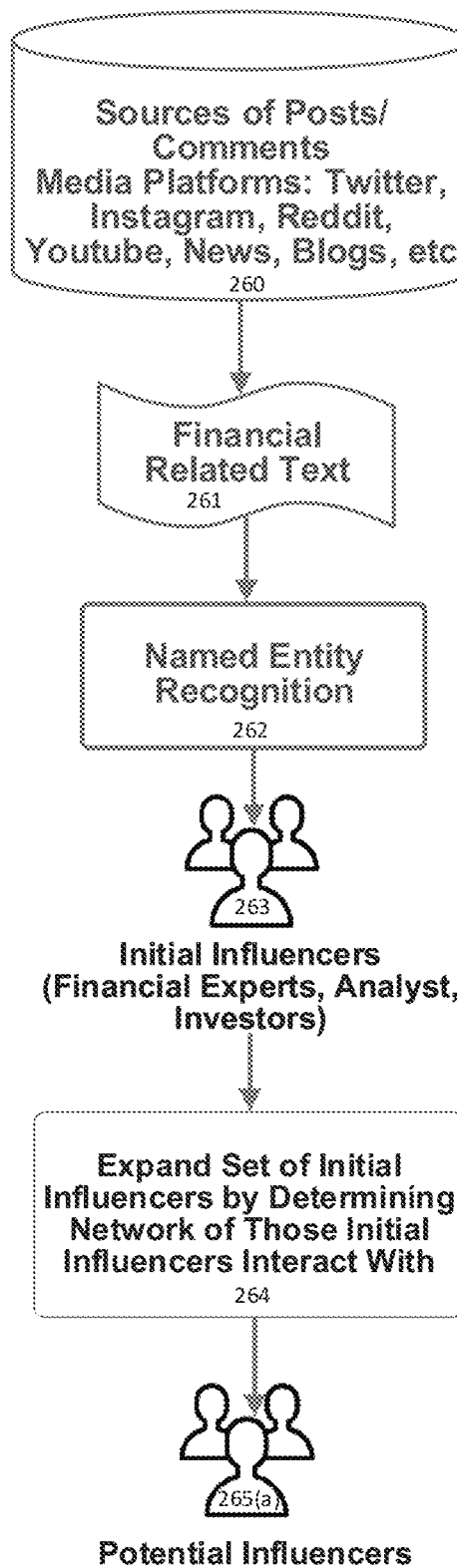
FIG. 2(b) is a flowchart or flow diagram illustrating a method, process, operation or function for identifying or discovering a set of initial "Influencers" from information obtained from social media and traditional media platforms, and expanding that into a set of potential influencers, in accordance with some embodiments.
Figure 2C:
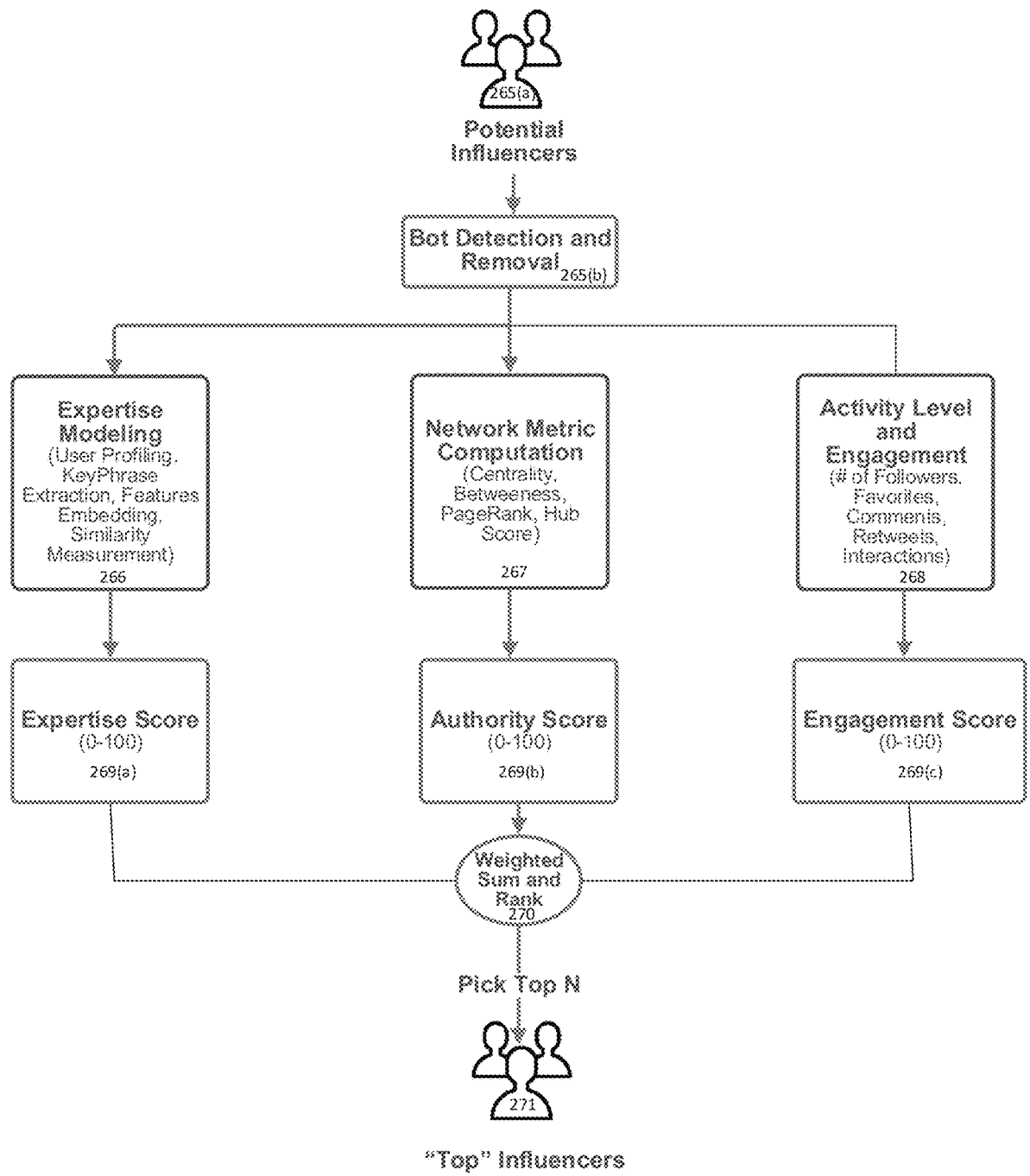
FIG. 2(c) is a flowchart or flow diagram illustrating a method, process, operation or function for evaluating each of a set of potential Influencers with regards to their expertise and ability to influence others, scoring each influencer and then ranking the scores to identify the "top" influencers, in accordance with some embodiments.

FIG. 2(a) is a flowchart or flow diagram illustrating a method, process, operation, or function for identifying or discovering one or more potential Influencers, evaluating or ranking each potential influencer with respect to their expertise and ability to influence others, determining an accuracy of the "top" influencers, determining a sentiment regarding a topic as expressed in a comment or post by each of the top influencers, generating an accuracy weighted sentiment measure for a set of comments or posts made by each of the top influencers (or a subset), and generating an indication of the overall confidence the set of top influencers have regarding the topic, in accordance with some embodiments. As shown in the figure, the overall processing pipeline 200 comprises the following primary functional modules or sub-processes:

Identify (discover) initial influencers (as suggested by step or stage 202) and expand set of initial influencers into set of potential influencers. This sub-process operates to identify one or more potential influencers by:
identifying keywords related to the topic or area of interest that are published in media sources or other more traditional sources of information (where the topic may be a company, a stock, an event, a trend, an item for purchase, a service, etc., as suggested by step or stage 204);
using the keywords, search for and identify posts on social networks that utilize the same or similar terms or phrases—the authors of these posts are candidates for being influencers (as suggested by as suggested by step or stage 206);
if applicable, filter social media posts to remove artificial posts by bots, etc.;
form a list of potential influencers from the set of initial influencers and/or other sources of relevant social media posts by expanding the set of initial influencers through analysis of the social network connections of the initial or other influencers (as suggested by step or stage 208);

in one example, this takes comments or posts in traditional media, uses those to identify the same sources in social media and possibly additional ones who use similar terms and concepts, and then expands the known set of social media sources to other possible sources or influencers by examining the social media sub-network associated with each source;

Score and Rank Each Potential Influencer (as suggested by step or stage 210). This sub-process operates to generate a score and ranking for each potential influencer with regards to their expertise and ability to influence others to generate a set of "top" influencers others by:

Generating/assigning an expertise score or metric for each influencer (as suggested by step or stage 212);
In some embodiments, this is done by determining a similarity between the posts/comments of the influencer and those of the language used in a corpus of relevant examples;

Generating/assigning a social network significance score or metric for each influencer (as suggested by step or stage 214);
In some embodiments, this represents the importance or the influencer to their sub-network of connections;

Generating/assigning a score or metric for each influencer indicating their ability to influence those in their sub-network (as suggested by step or stage 216);
In some embodiments, this represents to what degree an influencer's posts or comments are adopted and re-posted or otherwise passed to others;

Combining the three scores or metrics into a measure of the expertise of an influencer as weighted by their ability to influence others (as suggested by step or stage 218);

Order the list of influencers with regards to their combined scores to develop a ranking of the influencers;
Take the top N ranked influencers and consider these the "top" influencers, that is those influencers in the set of potential influencers having the highest expertise weighted ability to influencer others (as suggested by step or stage 219);

For each top influencer, generate a measure, score, or other form of evaluation of the accuracy of an influencer's comments or posts (as suggested by step or stage 220);
In one sense, this represents a measure of the accuracy of the influencer's "prediction" regarding the behavior of a stock, company, industry, trend, etc.;
The accuracy measure may be a function of time or be assigned a value within a specified timeframe (as suggested by step or stage 222);

Train a model to operate to determine the sentiment associated with an input (as suggested by step or stage 230). This sub-process operates to obtain a set of training data and labels/annotations for the set of data and use those to train a model (typically a machine learning model) to generate an output representing a measure or indicator of the sentiment (typically positive or negative) associated with an input by:
Obtaining examples of posts or comments regarding the topic or aspect of interest and associate a sentiment with each as a label or annotation (as suggested by step or stage 232);

In some embodiments, the data is labeled or annotated using a process that automatically assigns a sentiment based on a proxy or assumed indicator or reflection of the sentiment—this may be based on an observed change to the topic or aspect that is assumed to be strongly correlated with the sentiment as expressed in posts or comments made previous to the observed change;
For example, because positive sentiment expressed in comments or posts has been found to be correlated with a contemporaneous or later increase in a stock price, this relationship may be used as a proxy for sentiment;
That is, if during a time period, the price of a stock increased, it is assumed that comments or posts that preceded (by no more than a suitable timeframe) or were contemporaneous with the price increase were expressing a positive sentiment;

In some embodiments, the set of training data and labels are used with a suitable machine learning algorithm to produce a model (such as a NLP or other form of text interpretation or classification model) that operates to generate a measure or indicator of the sentiment (typically positive or negative or a degree of such) associated with an input (as suggested by step or stage 234);

Generate/Determine an Influencer Confidence Index for Each Top Influencer and an Overall Influencer Confidence Index (as suggested by step or stage 240);
For each of the top influencers or a specific set of those influencers, use the trained model (steps or stages 230) to determine a sentiment expressed by each of the influencer's comments or posts during a specific timeframe (as suggested by step or stage 242);
For each of the top influencers or a specific set of those influencers, determine an accuracy weighted sentiment value for each (or a plurality) of their comments or posts during the specific timeframe (as suggested by step or stage 244);
Combine the individual accuracy weighted scores to generate an overall confidence value/index for that influencer. In one embodiment, this combination may be a sum of products of the accuracy (during a timeframe) multiplied by the sentiment score for each comment or post made during that timeframe, followed by an averaging or normalization process;
Note that if data is not available or sufficient to determine the accuracy measure (as described with reference to step or stage 220), then instead, for each influencer, an expertise weighted sentiment factor or score may be generated for each relevant comment or post by combining the score or ranking for each influencer (i.e., a measure of their expertise and ability to influence others, as determined by step or stage 218) with the measure of the sentiment associated with each post or comment determined in step or stage 242;

Combine the Confidence Index for each of the top influencers (or a subset) to generate/determine an Overall Influencer Confidence Index representing a measure of the confidence or sentiment of the set of top influencers with regards to the behavior of the topic or aspect (as suggested by step or stage 246);
In some embodiments, this may comprise summing the set of overall confidence indices for each of the top or selected influencers, followed by averaging, filtering, or otherwise processing or normalizing the result;

Generate User Interface Displays (as suggested by step or stage 250);

In some embodiments, the user interface or display may comprise the overall influencer confidence index trend for the specific example aspect or topic at different scales (as suggested by step or stage 252);

In some embodiments, the user interface or display may comprise the trending topics of posts or comments in a word cloud format (as suggested by step or stage 254);

In some embodiments, the user interface or display may comprise a list of the top influencers as ranked by user selectable criteria (as suggested by step or stage 256);

In some embodiments, the user interface or display may comprise a list of the top messages ranked by the popularity of the messages or other criteria (as suggested by step or stage 258).

FIG. 2(*b*) is a flowchart or flow diagram illustrating a method, process, operation or function for identifying or discovering a set of initial "Influencers" from information obtained from social media and traditional media platforms, and expanding that into a set of potential influencers, in accordance with some embodiments. As shown in the figure, a system implementing the methods and techniques described herein may use as sources a set of traditional media platforms. These may include but are not required to include or limited to news sites, well-known blogs, etc. (as suggested by element or stage 260). Typically, each media platform provides its own streaming API to extract metadata, which can be used to identify and extract financial-related keywords 261 (in the use case of evaluating financial advice) in the content provided by a source.

In addition to or instead of traditional sources, social media networks may be used as a source to identify influencers. This may be done by finding references to a stock or topic of interest in social network posts (in some cases based on the same type of keywords or trending keywords identified for a traditional media source).

Using a named entity recognition process (262), the person or entity associated with a comment or post can be identified. The set of people or entities identified as posting comments or other material that is potentially relevant to the topic of interest are then identified as a set of initial influencers (263). The set of initial influencers is then expanded into a set of potential influencers by examining the network (or in most cases, a sub-network) of people or entities that each initial influencer interacts with over a social media platform (264). The set of potential influencers (265(*a*)) is then subject to further evaluation.

Thus, as described, a combination of identifying keywords or concepts in comments or posts, using named entity recognition to determine a source of the comment or post, and network analysis to expand those sources into other potential influencers can be used to generate a set of influencers for further evaluation. Each of these potential influencers may then be evaluated with regards to expertise, ability to influence others, effectiveness at influencing others, and accuracy to select those whose comments or posts will be analyzed to determine their sentiment regarding the topic of interest.

In some embodiments, the system may monitor financial news/posts published by news channels, blogs, forums, or other similar sources and based on financial keywords (e.g., revenue or stock related keywords) in those sources, the system identifies users on social media platforms who are associated with those keywords using a search API. They can be, for example, celebrities, financial analysts, or investors.

As shown in FIG. 2(*b*), in an Influencer(s) Discovery stage, the system "discovers" financial (or other types of) influencers from different media platforms, including Twitter, Reddit, News, Blogs, etc. In some embodiments, a first step is to find financial related text from those platforms. One is to search a stock's ticker name (e.g. $APPL, $TSLA, etc.) on all posts and articles published from those platforms. A second way is to a search company's name on posts published from well-known groups, accounts or channels focusing on stock market discussions (e.g. wallstreetbets on Reddit, Yahoo financial news). When searching a company's name, not only its full name, but also its alias and abbreviations may also be used for completeness.

After extracting financial related text, the system uses a "named entity recognition" process to identify the related person or entity names and use them as "initial influencers". Such initial influencers can be, for example, celebrities, financial analysts, or investors. As an example, person names can appear in the form of a full name or an account username, and the system will generally be able to recognize both types of names. Because social media platforms are used by influencers, they are a source that can be used to identify potential influencers. However, there is a technical barrier when attempting to extract user account names from text on social media platforms. Unlike people names, social media usernames cannot be recognized by traditional named entity recognition tools. Also, username is not a common word, which means it is not practical to represent it by a pre-trained word embedding.

Because of this obstacle, in some embodiments, a trained machine learning model is used for username recognition. Using approximately one million social media postings annotated with usernames, the inventors trained a character-level based AI model for Instagram username recognition. In the model. character embeddings are numeric representation of words by looking at their character-level compositions. Once trained, the model can identify social media usernames with 82% accuracy.

Each initial influencer or other user on social media can interact with others on a social network, through mention, reply or comment. The system can use this to further build up a network or set of potential influencers based on such interactions between initial influencers and their sub-network of contacts on a social network.

FIG. 2(*c*) is a flowchart or flow diagram illustrating a method, process, operation or function for evaluating each of a set of potential Influencers with regards to their expertise and ability to influence others, scoring each influencer and then ranking the scores to identify the "top" influencers, in accordance with some embodiments. As shown in the figure, each potential influencer (265(*a*)) discovered from the process flow described with reference to FIG. 2(*b*) is subject to an evaluation, scoring, and ranking process to determine a set of "top" influencers based on consideration of an influencers' expertise and ability to influence others.

As shown in the figure, each of the potential influencers (265(*a*)) is evaluated with regards to a set of areas, where in one embodiment, the system computes or generates three metrics. The system may use those metrics as inputs to a ranking and scoring module (for example, a rule-set or trained model) to generate a ranked list of influencers (which may be accompanied by an associated score or metric for each influencer). Prior to the scoring or ranking, a process to remove those influencers believed to be bots may be applied (as suggested by 265(*b*)).

In some embodiments, the metrics or measures may be generated by modules, methods, functions, operations, or processes that include, but are not limited to (or required to include):

- an "expertise modeling" module 266 (which in some embodiments, may take the form of a trained machine learning model) which operates to assign a score (269 (*a*)) for the expertise level of each potential influencer 265(*a*). In some embodiments, a language model is trained from a large amount of financial text corpus (i.e., business news, financial reports, etc.), using a state-of-the-art NLP technique, such as BERT (Bidirectional Encoder Representations from Transformers (BERT), a Transformer-based machine learning technique for natural language processing (NLP) pre-training). When the training process is completed and based on the trained model, the system can transform financial text into an embedding (i.e., a vector with fixed dimensions) to quantify the semantics in the financial domain. A "feature" vector for each influencer, based on their generated social media posts, or related news reports, can also be generated from the trained model; Next, a similarity score can be computed between the two vectors (i.e., the professional financial text embedding as compared to the influencer's personal content embedding) to generate a measure of the influencer's "expertise" 269(*a*) as an output of module 266. In one sense, the "expertise" metric is a measure of how much a person's expertise or opinions as reflected by their social media posts are considered influential or of value based on visibility of the content of their posts in the financial sources or a similarity between the contents of their posts and the contents of the financial sources;
- a "network metric computation" module 267 (which in some embodiments, may take the form of a trained machine learning model) which operates to compute a metric based on network analysis. As mentioned when discussing the steps or stages involved in identifying potential influencers, it may be found that influencers relate to each other or interact with each other and their interactions can be viewed as a form of social network. In this specific sub-network, each influencer is a node and their historical interactions (e.g., comments, mentions, reposts, tagging, etc.) are edges connecting nodes. Not every influencer is equally important in a social network and their importance in a particular social network can be measured by one or more types of network metrics, including closeness centrality, betweenness centrality, PageRank, Hub score, etc. The network is dynamic, as are the computed network metrics. A resulting authority score 269(*b*) may be generated; and
- an "activity level and engagement" module 268 (which in some embodiments, may take the form of a trained machine learning model) which operates to generate a measure characterizing how an influencer's audience/followers respond to the influencer's posted content; it is a measure of the degree of their reach and the effectiveness of their ability to exert influence. There are multiple metrics that can be used (independently or in combination) to measure activity and engagement level; these may include one or more of the number of followers, number of favorites or "likes", number of retweets, number of comments, etc. Some of these metrics are provided by a social network's platform API and are aggregated based on customized time windows (i.e., daily, weekly, or monthly). The fluctuations of the metrics from time to time may also be useful to characterize the dynamic change of activity and engagement level, which may also be used by the disclosed system. Based on this modeling or analysis, an engagement score 269(*c*) may be generated.

The measures or metrics for each potential influencer may be input to a "ranking and scoring model" or module 270 to produce an output that scores (or combines previously generated scores) and then ranks the potential influencers with regards to their expertise and ability to influence others. In some embodiments, the ranking can be based on a score for each influencer (269(*a*), 269(*b*), and 269(*c*)) that is combined (added, weighted and summed, etc.) to generate an overall score for each potential influencer (270). Note that with sufficient data, a model may be trained or a rule-set may be developed to combine the three metrics (in this example) based on the relative impact each factor has on the ability to influence another person.

As mentioned, a rule-based method may be used to combine one or more of the different metrics into a single score, based on which the influencers may be ranked or otherwise ordered. The rule may implement a heuristic weighted sum, application of a filter or threshold, conversion or mapping of a metric or metrics, fitting of metrics to a polynomial, etc. The top N ranked of the potential influencers may then be selected as the "top" influencers (271) and subjected to further analysis.

In one embodiment, the system may generate a score as the metric used to rank the potential influencers (after removal of bots or other suspicious potential influencers). The score may be in the range of 1-100 and represents the relative expertise or ability of a person to influence others.

As described, in some embodiments, a measure of the accuracy of an influencer's comments or posts with regards to the behavior of a stock may be determined. This metric or measure captures the accuracy of the influencer's comments or posts instead of their presumed expertise or ability to influence others. In one embodiment, this accuracy score or predictive performance can be generated for three different time horizons or timeframes: short-term, mid-term, and long-term, where:

Short-term historical performance is based on the accuracy of an influencer's "predictions" on daily returns within a period of 1-7 days;

Mid-term historical performance is based on the accuracy of the predictions on a quarterly basis, i.e., a stock's return as calculated from the time when the post was created to 3 months later; and Long-term historical performance is based on the accuracy of the predictions on a yearly basis, i.e., a stock's return as calculated from the time when the post was created to 12 months later.

Using this timeframe-based approach, each influencer may be assigned three scores: short-term prediction accuracy, mid-term prediction accuracy, and long-term prediction accuracy influence.

As mentioned, the prediction or performance accuracy is a measure of the probability of an influencer's positive or negative outlook (or opinion) regarding a stock being followed by an associated increase or decrease of the stock after the influencer's comment or post. In this sense, the accuracy reflects both the correctness of the influencer's comment or post and of the likelihood (probability) of the influencer actually influencing people, as reflected by the movement in the stock price. In one embodiment, this may measure be determined as follows:

1) Given a message (i) posted by an influencer (u) on day (t) about a stock (s) and let sent$_i$ denote the sentiment of the message. Let $r_d$, $r_q$, $r_y$ represent the minimum threshold of return changes on daily, quarterly, and yearly scales, respectively. Threshold for return: the threshold is set up based on different industries.
2) Compare the polarity (i.e., positive, negative) of sentiment against stock (s)'s daily, quarterly and yearly returns, respectively.
3) If the sentiment is positive, and the daily return of any of the next 1-7 days is above $r_d$, then the short-term prediction is considered correct.
4) If sentiment is positive, and the following quarterly return is above $r_q$, then the mid-term predicted result is considered correct. The quarterly return is calculated from the time when the post was created to 3 months later.
5) If sentiment is positive, and the following yearly return is above $r_y$, then the long-term predicted result is considered correct. The yearly return is calculated from the time when the post was created to 12 months later.
6) The same rule applies to negative sentiment and negative returns. In other words, if sentiment is negative and followed by the decrease of return above the defined threshold, it is also considered as a correct prediction.
7) Let $acc_{i,short}$, $acc_{i,mid}$, $acc_{i,long}$ represent the short-/mid-, and long-term prediction accuracy of message (i), respectively. 1 indicates correct prediction, while 0 indicates wrong prediction.
8) If the influencer (u) posted N messages on stocks, the prediction accuracy of u is the average of all the posts, i.e.

$$acc_{short} = \frac{\sum_1^N acc_{i,short}}{N}, acc_{mid} = \frac{\sum_1^N acc_{i,mid}}{N}, acc_{long} = \frac{\sum_1^N acc_{i,long}}{N}.$$

9) The obtained $acc_{short}$, $acc_{mid}$, and $acc_{long}$ are then considered the influencer's short-/mid-/ and long-term accuracy scores.

Figure 2D:
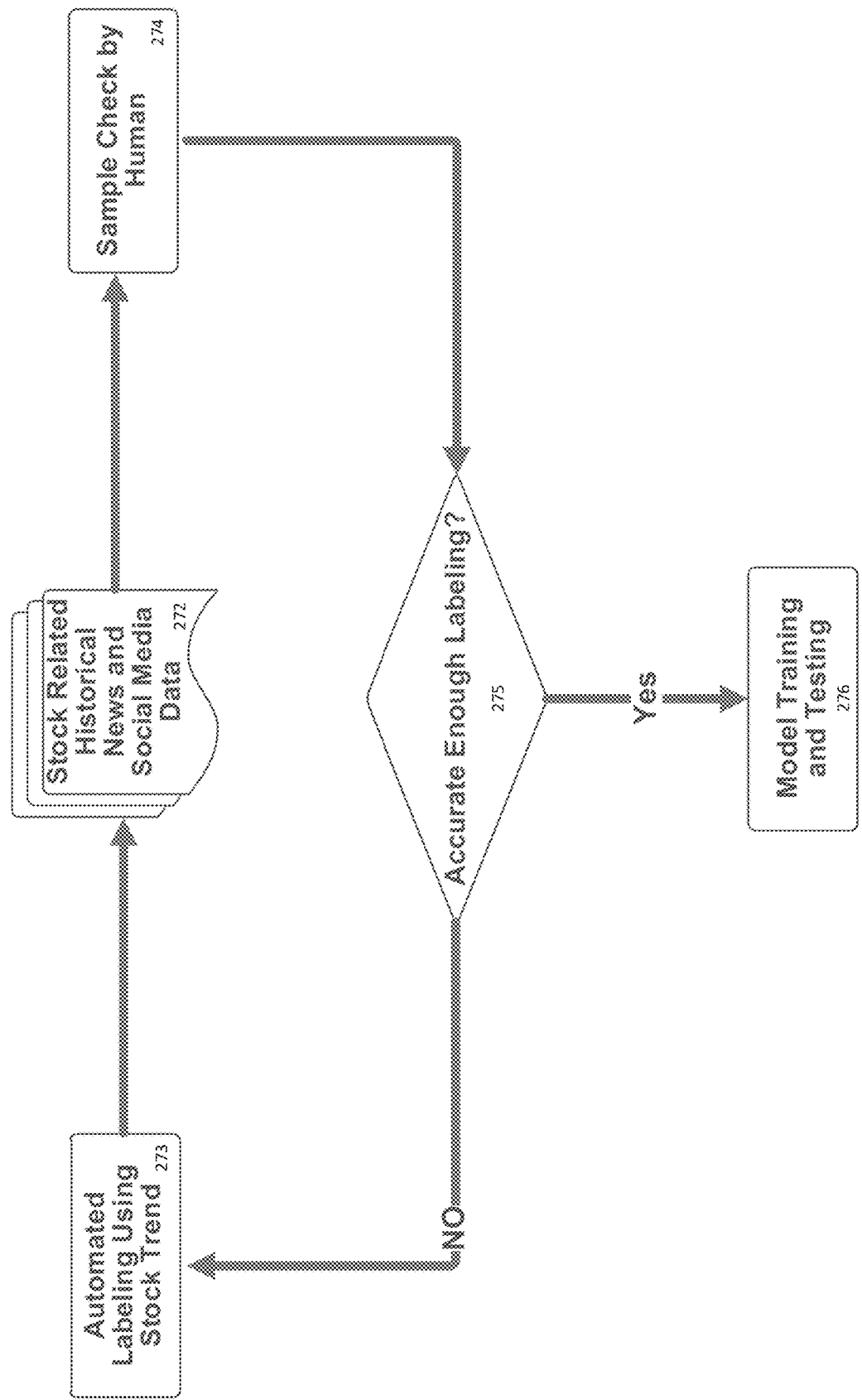
FIG. 2(d) is a flowchart or flow diagram illustrating a method, process, operation or function for automatically annotating or labeling a set of training data, and training a machine learning model to classify a comment or post with regards to its sentiment, in accordance with some embodiments.

FIG. 2(d) is a flowchart or flow diagram illustrating a method, process, operation or function for automatically annotating or labeling a set of training data, and training a machine learning model to classify a comment or post with regards to its sentiment, in accordance with some embodiments. In some embodiments, a determination of the sentiment expressed in (or a classification of) a post or other form of commentary can be obtained through use of a trained machine learning or similar model. In some embodiments, such a model may be created by the following processes:

Generation of data labels or annotations for training data—in a difference from a traditional sentiment classification problem where the labels/annotations are generated solely by human labor, in some embodiments, the system uses a proxy or indirect indication of sentiment in the form of a stock market trend to automatically (or at least less expensively) label/classify the sentiment of posts, messages, comments, news, tweets, etc. This is based on an assumption (more specifically, a recognized association between sentiment and the behavior of the financial system) that positive news regarding a company generally leads to an increase in its stock price, and negative news generally leads to a decrease in the stock price. In practical terms, this means that if an increase in stock price is noted over a period, then it is assumed that a contemporaneous or somewhat earlier post or comment may be labeled as expressing a positive sentiment, and vice-versa;

Based on this recognition of the behavior of the proxy for the sentiment expressed in a post or comment, the system can efficiently and cost-effectively collect a larger annotated dataset for use in training a machine learning model than can be produced when relying solely on human labeling. To implement this form of automated annotating, the system may collect a large number (e.g. several thousand or more) of stock-related historical news, posts, comments, and tweets (as suggested by step or stage 272) and develop a rule based on a stock's price trend, and then use that to automatically label the data (as suggested by step or stage 273);

In this use case or example embodiment, the "rule" or heuristic would be of the form that "if an increase in stock price is noted, then it is assumed that a contemporaneous (or slightly previous) post or comment may be labeled as expressing a positive sentiment." Therefore, an upward trend in a stock price would be associated with positive sentiments being expressed just previous to and during that upward trend, and vice-versa (a suggested by 273). In a sense the sentiment of the posts or comments are treated as a leading indicator of stock price movement. As will be described, this type of indicator may be used in other situations to assist in the automated or semi-automated labeling of posts or comments with regards to sentiment;

For other use cases or environments, it may be helpful to identify a similar type of proxy for sentiment to assist in training a machine learning model. For example, in developing an influencer confidence index for a specific trend, it may be helpful to use evidence of whether that trend accelerated in adoption (such as by examining polling data, sales of specific styles or items, increased advertisements, increased recognition by others, increased appearance on playlists, increased manufacturing demand, etc.) contemporaneously with or soon after a post or posts by a potential influencer. Other similar examples of proxies for sentiment labeling may be determined based on identifying suitable "evidence" of an increase or decrease in sales, publicity, popularity, adoption, or another characteristic related to an event or item that occurs soon after a set of posts.

Figure 2E:
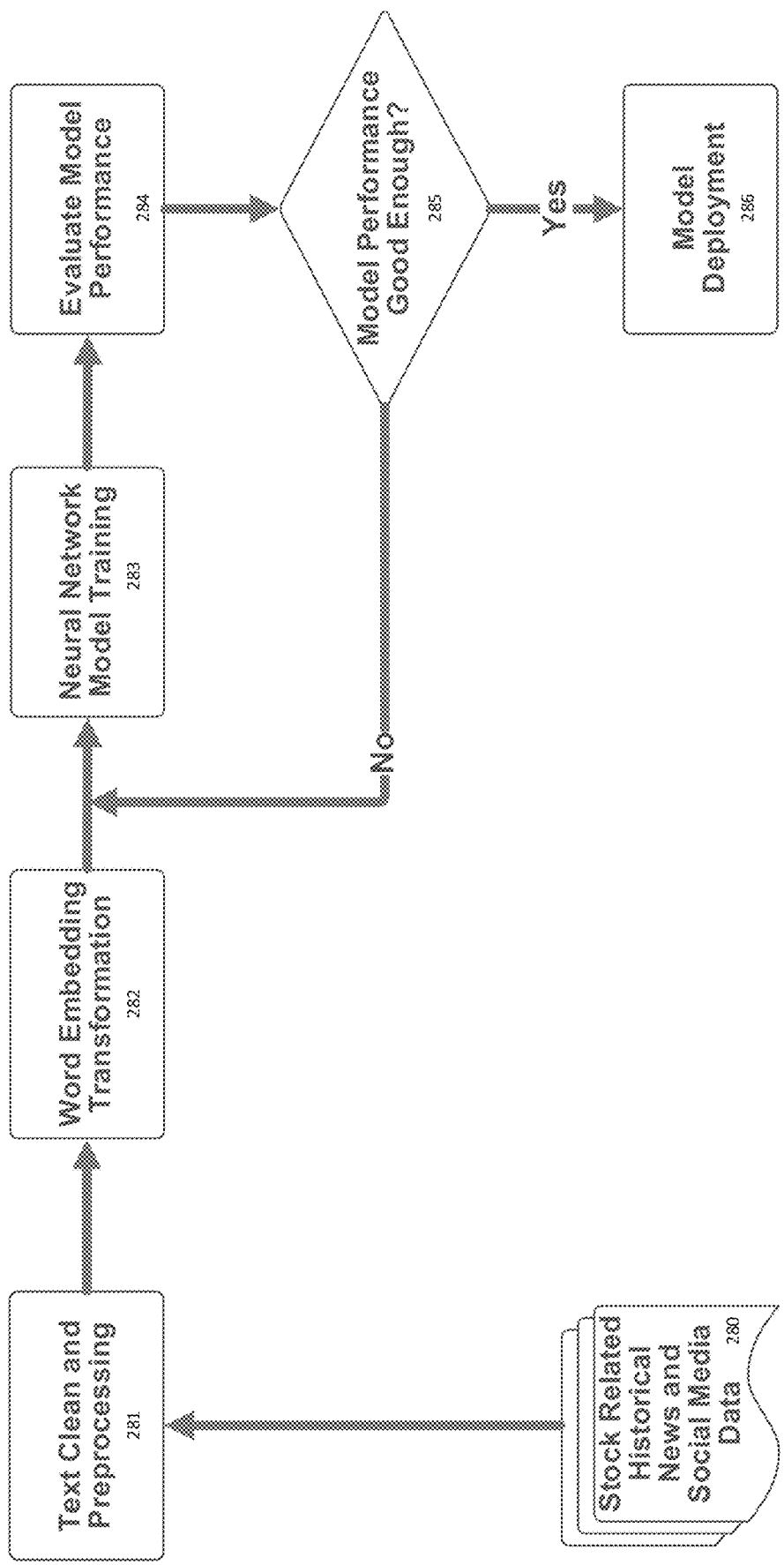
FIG. 2(e) is a flowchart or flow diagram illustrating a method, process, operation or function for evaluating the performance of a trained sentiment model using a set of training data and annotations generated by a process of the type described with reference to FIG. 2(d), and deploying the trained sentiment model to perform an inference process on the sentiment associated with an influencer's comment or post, in accordance with some embodiments.
Figure 2F:
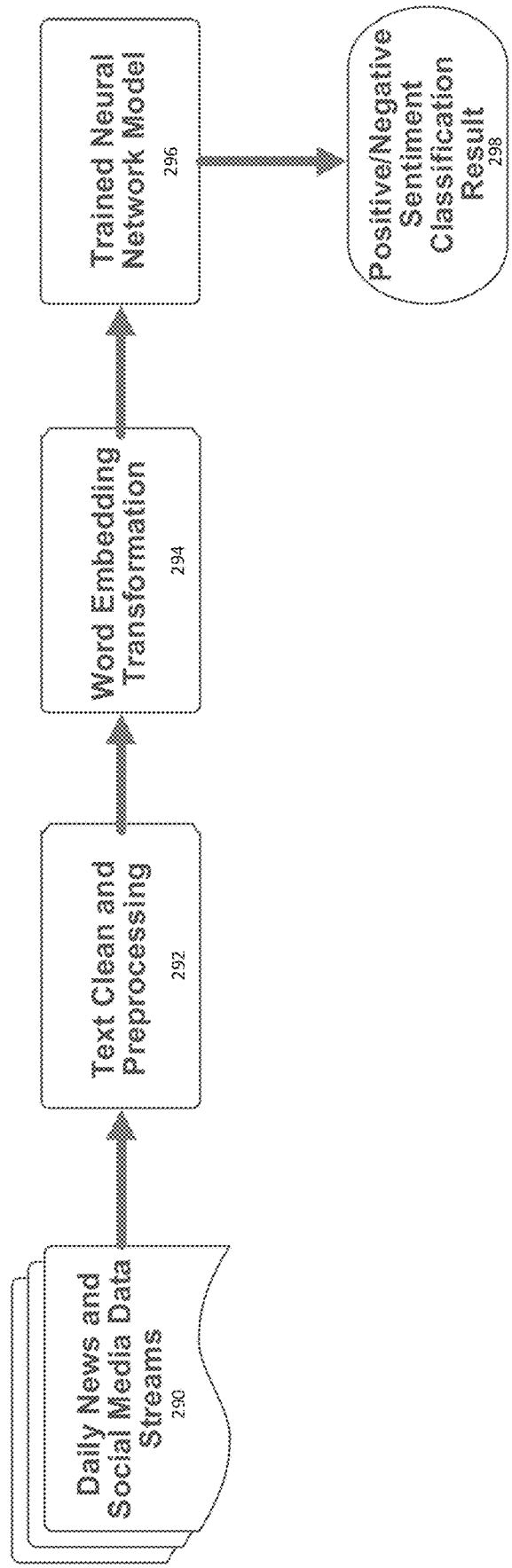
FIG. 2(f) is a flowchart or flow diagram illustrating a method, process, operation or function for processing an influencer's comment or post and using a trained sentiment model to classify the comment or post with regards to its sentiment, in accordance with some embodiments.

To reduce the potential error arising from the use of automatic labeling, a smaller number of human generated labels may be introduced to supervise and refine the automated labeling process and/or a human may check a sample of the automatically generated labels or annotations for accuracy (as suggested by step or stage 274);

Once the accuracy of the automated labeling process is determined to be sufficient (as indicated by the "Yes" branch of step or stage 275), the process may move to the model training and testing stage (as suggested by step or stage 276);

Sentiment Model Training—FIG. 2(e) is a flowchart or flow diagram illustrating a method, process, operation or function for evaluating the performance of a trained sentiment model using a set of training data and annotations generated by a process of the type described with reference to FIG. 2(d), and deploying the trained sentiment model to perform an inference process on the sentiment associated with an influencer's comment or post, in accordance with some embodiments. Once the accuracy of the automated labeling process has been determined to be sufficient, the labeling process may be used to generate training data for a machine learning model. This may be accomplished by the following processing:

- the input text from stock related sources (as indicated by 280) may first be provided to a preprocessing module (as suggested by step or stage 281), where the raw text is tokenized, normalized (stem/lemmatization), etc.;
- next, the preprocessed text is transformed into an embedding representation with a fixed dimension (step or stage 282. In some embodiments, the system uses the Glove/Word2Vec embedding format; in others, it may use a more advanced BERT/GPT embedding format;
- once the text is transformed into embeddings, the embeddings may be provided as inputs to a neural network model or models that may be implemented as deep learning models (step or stage 283). The system may use one or more of multiple neural network models, such as FastText, CNN/RNN, or a pre-trained language model, i.e. BERT;
  - the training process is iterative, and the model's performance is typically evaluated or measured by a model loss metric (step or stage 284);
  - if the model's performance is satisfactory, then the model is ready for deployment (as suggested by the "Yes" branch of step or stage 285 and step or stage 286);

Model Deployment and Inference—FIG. 2(f) is a flowchart or flow diagram illustrating a method, process, operation or function for processing an influencer's comment or post and using a trained sentiment model to classify the comment or post with regards to its sentiment, in accordance with some embodiments. Once the training and performance of the sentiment model are acceptable, the system may move into the model deployment stage. For example, Amazon's AWS or another form of cloud-based platform may be used for deployment of the trained model;

- in an example of the model's operation, a new post, message, or item of news is obtained (suggested by step or stage 290) and subjected to the cleaning and preprocessing steps described with reference to FIG. 2(d) as applied to the training data (as suggested by step or stage 292);
- this is followed by transforming the preprocessed comment or post into an embedding representation (as suggested by step or stage 294);
- the embedding representation is then input to the trained model (as suggested by step or stage 296);
- the input is processed by the model to generate an indicator or classification of the input data with regards to the sentiment expressed by the input (as suggested by step or stage 298);
  - in some embodiments, the model output may take the form of a value between zero and one with zero representing a clearly negative sentiment and one representing a clearly positive sentiment;
  - in some embodiments, the model output may take the form of either zero or one.

One goal and benefit of the system and methods described is to provide an Expert-Weighted Sentiment Analysis Platform. In some embodiments, potential influencers are detected and ranked through analysis and evaluation of multiple platforms (i.e. social media or traditional media). In some embodiments, an accuracy measure for each of the top ranked influencers may be determined. Next, their published content (i.e. news, blogs, social posts, etc.) is analyzed and categorized based on the expressed sentiment (typically considered as positive or negative), as determined by a trained model. An accuracy weighted sentiment measure is determined for each of a plurality of comments or posts by each top influencer. By combining the accuracy weighted sentiment measure for the plurality of posts, an overall sentiment index or measure for each top influencer with regards to a stock, industry, trend, etc. may be determined. Next, the overall sentiment index or measure for each top influencer may be combined to produce a measure of the top influencers' confidence or expected performance of the stock or other item. The influencers' confidence index or metric and underlying data may be used to generate one or more user interface displays for presentation to a user. In some embodiments, a user may be provided with tools to enable further exploration and analysis of the confidence index, its trends, its constituent data, etc. The influencers' confidence index is expected to provide a comprehensive, forward-looking, and real-time perspective on markets and economic trends than conventional indices based on surveys and inputs from a small number of the public.

With regards to the automated annotating or labeling of the training dataset, in order to reduce errors, the process may only consider days (and hence comments or posts associated with days or previous days) having more "sudden" changes in stock prices and remove from consideration those days with relatively minor changes. This may be achieved by applying a Peak Detection method that can automatically identify local maxima/minima during a time interval (e.g., 14 days). Also, a relatively high threshold (+/−30%) may be set to ensure that the magnitude of a peak/valley is significant. In this example of filtering criteria, the days when text data (comments or posts) is collected and annotated or labeled are those that satisfy two criteria: 1) the stock price of the next day (t+1) increases/decreases by at least 30%; and 2) the stock price represents a local maxima/minimum point during a two-week period.

As an example, in one embodiment the following (pseudo) algorithm may be used as part of implementing an automatic data labeling/annotating process:

1) Automatically generate a sentiment labelled dataset based on sufficient (in terms of degree and timing) changes in the price of a stock;
2) Randomly sample a subset of the labeled dataset and send to human for manual verification;
3) Based on human verification, and if needed, refine the method by adjusting the peak magnitude threshold or semantic rules to further improve automatic labelling; and
4) Repeat steps 2) and 3) as needed until the accuracy as verified by a human is considered satisfactory.

Another aspect of the labeling process that may be controlled is the time window used for data collection. This can be important, as movements in a stock price may be tied to an influencer's comments or posts but occur after a delay from when a comment or post is circulated. For example, in one embodiment, text posted between 9:00 am and 9:30 am EST may be excluded from analysis. This can allow time for previous comments or posts to be acted upon and reflected in a change in the price of a stock by execution of a buy or sell order.

One or more of the trained model or models described herein may take the form of a neural network which is developed as part of a machine learning model. The trained model or network may be referred to as a deep learning model. Such models include convolutional neural networks (CNN), recurrent neural networks (RNN), and pre-trained language models used to generate embeddings, such as BERT (Bidirectional Encoder Representations from Transformers). As described herein BERT may be used to:

1. Pre-train a language model based on large sets of financial text, including financial news, fiscal reports, and financial forum posts. When the model is trained, it is used to transform a financial-context sentence into an embedding, with the embedding then used to compute an expertise score for each influencer and across different industries; and
2. Fine-tune the pre-trained model by inputting sentiment-labeled training text. This is a classification task (i.e., classify a financial text into positive or negative sentiment) and a BERT model can currently provide the best performance in such a task.

The artificial intelligence techniques described herein include the following and in some embodiments are used as described:

Knowledge Graph: A "large company" knowledge graph may be built based on analyzing text, including Wikipedia, Financial News, Income Statements. For each company, its full name, alias names, products, parent organization, subsidiaries/brands, products, and industry may be identified and used. In some embodiments, the Knowledge Graph is used in the following situations:

1. When searching company related financial text, all forms of the company's names are used as part of a search query, including the full name and alias names;
2. When computing an influencer's confidence index regarding a company, the influencer's sentiment as determined from posts mentioning the company's full name, alias names, subsidiaries, brands, and products are aggregated; and
3. When computing an influencer's confidence in an industry, all confidence indices for companies belonging to the industry are aggregated.

NLP: A challenge in applying natural language processing (NLP) techniques to the interpretation of sentiment and the determination of a confidence index is twofold. Firstly, most of the data is user-generate content (i.e., social media posts, forum discussions), which is typically short and noisy. Secondly, the content of the text is related to financial concepts and markets, and hence may contain financial related slang and jargon (e.g., buy, sell, hold, dip, etc.). As a result, conventional NLP models trained on more general and commonly used text data are likely to not perform adequately. As examples:

1. Username recognition. This is an important step in discovering influencers. In most social media posts, a person's name usually appears in the form of a username, an abbreviation, or another alias. To address this issue, embodiments use a named entity recognition technique or model;
2. Financial Semantic embedding. To evaluate an influencer's expertise, embodiments use an embedding technique to transform the influencer' postings into vectors (embeddings). The conventional NLP embeddings are derived from Wikipedia or news sources. However, to be accurate, embodiments need to rely on embeddings that better represent financial and market contexts. As a result, in some embodiments, the state-of-the-art NLP BERT model is used to train and generate embeddings from a large set of financial and market related content; and
3. Sentiment Analysis and Transfer Learning. Since sentiment analysis in the financial context is different than sentiment analysis based on general text, embodiments use a sentiment classifier based upon the trained BERT model. This is an example of a form of transfer learning.

Semi-supervised Machine Learning: Another challenge in sentiment analysis is that there are limited human labels that may be used to train r model. To address this data sparsity issue, some embodiments automatically generate positive and negative "pseudo labels" based on the upward/downward movements of the price of a stock. To ensure the quality of the pseudo labels, an initial set of pseudo label samples are checked by humans. Based on the error analysis, embodiments may improve the process by adjusting hyperparameter and semantic rules to generate labels. The process continues until a satisfactory level is reached, as determined by human annotators.

Figure 3:
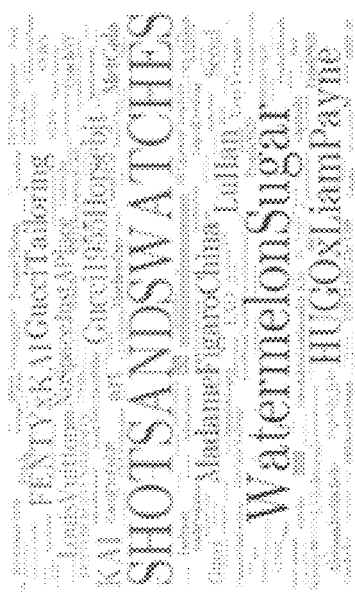
FIG. 3 is a diagram illustrating a display, screen, or user interface that may be generated by a system implementing one or more of the methods described herein, in accordance with some embodiments.
Figure 3:
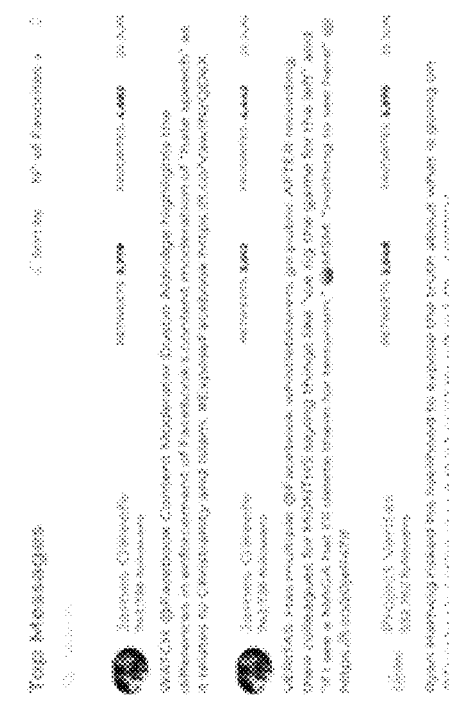
Figure 3:
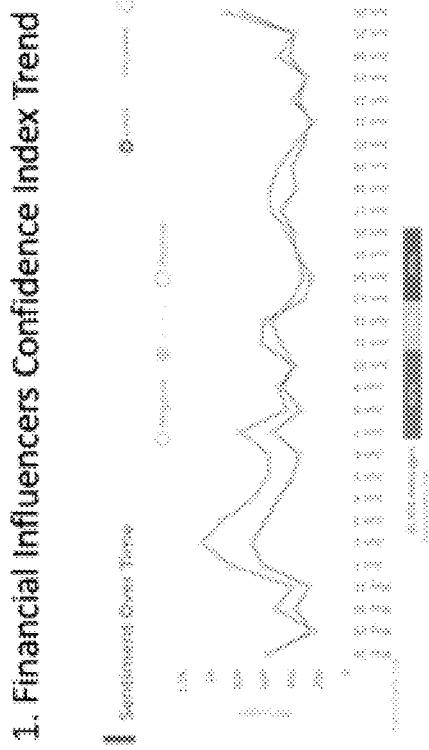
Figure 3:
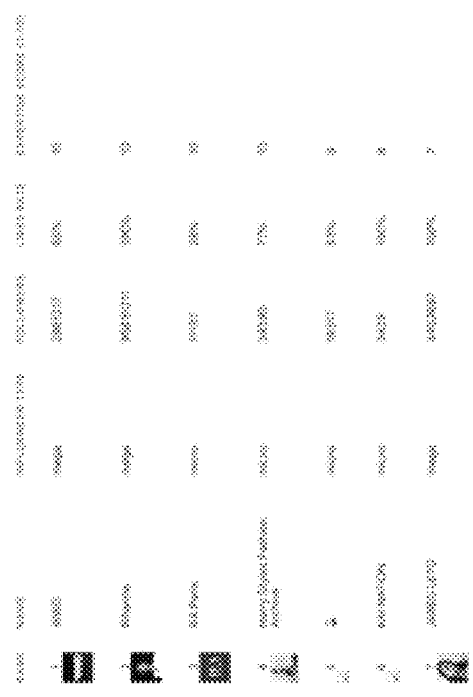

FIG. 3 is a diagram illustrating an example display, screen, or user interface that may be generated by a system implementing one or more of the methods described herein, in accordance with some embodiments. The outputs and insights of the system may be presented to a user as a display or user interface (UI), as shown in the figure. The primary components or elements of an example of such a display or interface may comprise:

In a first component, section, window, display, or UI element, "Financial Influencers Confidence Index", a user can view the confidence index trend at different scales: daily, weekly, and monthly (as examples). In some embodiments, when the user puts a mouse over (hovers), he/she can see the specific confidence index (i.e., sentiment) values, as well as the corresponding positive and negative messages found and evaluated. When the user clicks into a specific date (such as where a spike occurs), he/she can view the highlighted messages on that date to find out more about what happened during a spike;

In a second component, "Trending Topics", the user can see the trending topics in a word cloud format. In this format, the larger the font size, the more important the topic is believed to be, or at least it is more commonly mentioned or referred to in a post or comment. When the user clicks on a specific topic, he/she can view the related messages in a pop-up window;

In a third component, "Top Influencers", a list is presented of top influencers as ranked by different criteria, which the user can choose to rank differently. The ranking criteria may include the number of followers and an expertise score as described herein;

In a fourth component, "Top Messages", is shown a list of highlighted or top messages ranked by the popularity of the messages in terms of their frequency of being retweeted/liked and in some cases, a sentiment score as determined by the processes described herein.

Note that in contrast to a traditional/conventional Confidence index dashboard or other similar form of indicator (such as the Gallup Economic Confidence Index), the generated dashboard described herein can be configured to show not only the confidence/sentiment trend, but also the trending topics/highlighted messages and the top influencers discovered. The (Financial) Influencer Confidence index automatically collects, processes, and evaluates a set of financial influencers' opinions from online data, based on the NLP algorithms and models described herein. The Confidence Index provides an efficient way of tracking the economic views of financial (or other) experts and influencers, understanding their concerns for the economy and financial markets, and their outlook on industry growth and trends, one or more of which can provide valuable insights for investment decisions.

In some embodiments, the Influencer score used to rank potential influencers may be incorporated when the system generates an Index, as the index is weighted by an Influencer's expertise and ability to influence others. As a guideline, the higher the expertise-weighted score of an Influencer, the more important his/her opinion is believed to be. Similarly, the higher the accuracy-weighted sentiment assigned to a comment or post, the more relevant it's sentiment is expected to be when considered among a plurality of comments or posts. In one embodiment, the influencer confidence index is a weighted average of all potential or significant influencers' expertise-weighted sentiment scores, and may be calculated as follows:

$$\text{influencer confidence} = \frac{w_1 * \text{sentiment score}_1 + \ldots + w_n * \text{sentiment score}_n}{w_1 + \ldots + w_n}$$

where influencer confidence is the overall index, and $w_i$ is the ith influencer's historical prediction accuracy score, and sentiment score$_i$ is the average sentiment score of the influencer.

In some embodiments, the Influencer confidence index may range from 1-100 (mostly bearish to mostly bullish). In one example of a UI display for a user, the system may show the aggregated Influencer Confidence Index trend and highlight top-ranked influencers and their specific opinions, so a user can follow or pay more attention to those sources.

With regards to the possible uses of the influencer confidence index: (1) similar to other survey-based Confidence indices, users can use the index at the macro-level to see the confidence trend (going down or going up) from the financial influencers' perspective, and (2) the system's algorithms and data processing can help a user to "discover" or identify top influencers, so that the user can follow their specific opinions at the micro-level for further insights and recommendations based on their views on companies, the economic situation, and industry trends.

Note that the methodology and processes for discovering influencers in the financial domain can be extended to other fields such as retail, fashion, design, architecture, automotive, furnishings, food, technology, and healthcare, as examples. The application describes a specific sentiment analysis algorithm for the financial domain. Note that this form of sentiment analysis can be used to analyze financial influencers' social media posts but can also be generalized to analyze other types of financial data, such as news and company reports. Based on financial news/company reports sentiment analysis, one may gauge the overall market mood and/or issue alerts to users when extreme or otherwise atypical positive/negative news is detected by an embodiment of the system.

In general, the methods and data processing disclosed herein may be used to generate an indication of the confidence that a set of influencers have in the expected positive or negative behavior of a company, an industry, a trend, a fashion, the popularity of a specific item, an automobile, etc. In some embodiments, the indication is generated by a process that comprises the following:

Identify one or more persons or entities that may be considered influencers with regards to the behavior of a specific item, entity, or trend;
  This may include identifying a set of potentially relevant comments or posts using keywords or other characteristics of a comment or post;
    This identification may first start with traditional media sources that are recognized to contain comments and analysis of "experts" in an area and then extend that set of experts or influencers to others;
    Extending the initial set of "experts" to other potential influencers may be done by using the recognized experts' content to provide a source for comparison with the content of others in either traditional or social media;
      This may be done by generating content embeddings for the expert's content and comparing the closeness of those embeddings to the content posted on social media;
    Extending the initial set of experts may also be done by considering the social network connections of each of the initial set or of an extended set (such as by a form of network analysis, or closeness measure);
    If necessary, to associate the identified comments or posts with a source, such as a person or entity may require further processing such as use of a named entity recognition process for social media content;
  The result of the above set of processes will be a set of potential influencers that are identified across both traditional and social media sources;
Evaluate each potential influencer's level or degree of expertise;
  This may include identifying indicia of expertise or determining that a particular person's comment or posts are using similar language and concepts to those of a recognized expert (such as an author of financial texts, policies, etc.) and are generally in agreement with those experts;
    This may be done by generating content embeddings for the expert's content and comparing the closeness of those embeddings to the content posted by another potential influencer;
  In some embodiments, this may also include evaluating the accuracy of a person's comments or posts to determine if they are correct in their "predictions" of a behavior with a sufficient frequency to be considered an "expert" or more likely to be correct;
Evaluate each potential influencer's ability to influence others;
  This may include determining the extent of the social media network connections of a recognized influencer from a traditional media source and the impact of the influencer's comments or posts on others (as suggested by the response of others to the comment or post, the reposting of the comment or post, etc.);
In a sense, this is identifying a recognized expert in traditional media and then extending their sphere of influence beyond consumers of that traditional media source to social media connections of the expert or to the social media connections of those who tend to agree with the expert;

Form a score/metric representing the expertise weighted ability of a potential influencer to influencer others, and rank each potential influencer based on their expertise and ability to influence others;
Identify the top N ranked potential influencers as "top" influencers whose content will be subject to further analysis;

For each of the identified top influencers, determine the sentiment expressed by each of their relevant posts, comments, or advice;
This may include training a machine learning model to classify an input statement or group of statements with regards to whether they exhibit a positive or negative sentiment regarding an item, topic, entity, or event;

For each top influencer, determine a measure of the historical accuracy of that person's comments or posts;
In some embodiments, this may be dependent upon a timeframe, that is, a person's comments or posts may be more accurate with regards to short or near-term behavior compared to medium or longer-term behavior;

Generate an index or measure of the current confidence in the behavior of the stock, company, trend, etc. for each top influencer by forming an accuracy weighted sentiment value for each relevant comment or post and combining those;
For example, this may be an averaged or normalized sum of terms, where each term is a product of an accuracy measure (during a relevant timeframe) and a sentiment measure (for a comment or post during the same timeframe or relevant to that timeframe);
If sufficient or reliable enough accuracy related data is not available, then instead, the measure of the expertise weighted ability of a person to influence others may be used to weight the sentiment or a sum of sentiment values;
Note that the level of expertise and ability to influence others are likely connected (as it is assumed that a demonstrated expertise will enhance someone's ability to influence others) but together represent a way of approximating the weight to be given their opinion or advice as expressed in a positive or negative sentiment;

Generate an overall influencers' confidence index by forming a combination of each top influencer's current confidence index, where the overall index represents the overall confidence a set of (top) influencers have in the behavior of the company, industry, trend, fashion, item, automobile, etc.; and Generate a user interface or display enabling a user to view and interact with one or more of
In some embodiments, the user interface or display may comprise the overall influencer confidence index trend for the specific example aspect or topic at different scales;
In some embodiments, the user interface or display may comprise the trending topics of posts or comments in a word cloud format;
In some embodiments, the user interface or display may comprise a list of the top influencers as ranked by user selectable criteria;
In some embodiments, the user interface or display may comprise a list of the top messages ranked by the popularity of the messages or other criteria.

Note that for other use cases or environments, it may be helpful to identify a similar type of proxy for sentiment to assist in training a machine learning model. For example, in developing an influencer confidence index for a specific trend, it may be helpful to use evidence of whether that trend accelerated in adoption (such as by examining polling data, sales of specific styles or items, increased advertisements, increased recognition by others, increased appearance on playlists, increased manufacturing demand, etc.) contemporaneously with (or soon after) a post or posts by a potential influencer. As another example, for developing an influencer confidence index for a specific type of cuisine or adoption of a style of clothing, it may be helpful to use evidence of whether that type of cuisine or style became more popular (such as by examining sales data for a set of restaurants or food ingredient suppliers, sales data for a specific manufacturer or clothing label or item of clothing, the offering of a similar style by multiple vendors or companies, etc.) contemporaneously with (or soon after) a post or posts by a potential influencer. Other similar examples of proxies for sentiment labeling may be determined based on identifying suitable "evidence" of an increase or decrease in sales, publicity, popularity, adoption, or another characteristic related to an event or item that occurs soon after a set of posts.

As mentioned, in some embodiments, ranking and/or scoring a financial influencer, or determining the sentiment associated with an influencer may be performed using a trained machine learning (ML) model. During a training phase, the inputs to a model are a set of training data and an associated set of labels or annotations, with one such label or annotation being associated with each set of data. The labels are the desired outputs of the trained model and serve to "teach" the model how to associate the input attributes (influencer social network posts, financial news/information, for example) with the desired output information (the sentiment of the post or comment, or in some cases a score for an influencer representing their expertise, ability to influence others, etc.). A machine learning model is trained on the labeled dataset in a form of supervised learning. The resulting model itself may be a deep neural network (DNN) or similar form of representing a trainable set of relationships.

In one example, a machine learning model may be trained using a set of training data.

The training data may include an influencer's social media posts and financial news or commentary. In addition, the training data includes a corresponding label, indicator, or annotation for each set of input data specifying the correct sentiment, score, or metric for that post or influencer. The data and labels are used with a suitable machine learning algorithm to generate a model by "teaching" the model how to respond to the input data, producing a trained machine learning model. When trained, the model will operate to respond to new input data by providing an output that indicates the most likely sentiment to be associated with the input. Note that this description of the operation of a trained model is for one of several trained models that may be used in implementing an embodiment of the system and methods described herein. Other models will typically utilize different types of training data and different annotations or labels.

In some embodiments, a subset of potential influencers or of the top influencers may be selected as the basis for generating an overall confidence index. The subset of influencers may be chosen based on criteria, such as membership in a group, being employed by a specific organization, being involved in a specific industry, having a policy role in government, being published in a specific journal or newspaper, having a high degree of visibility, etc.

The individual influencer and overall confidence index described herein may be used for several purposes. When serving as an indication of the expected movement of the price of a stock or as an indicator of the expected behavior of a financial market, the index may be used to:
- detect shifts or changes (increase/decrease) in influencer confidence and trigger an alert to current or prospective investors;
- develop or modify an investing strategy, for example, execute a sentiment momentum investing strategy, in which investors buy equities that are rising and sell them when they look to have peaked; or
- combine with other market and economic indicators (e.g., market volatility, consumer confidence index, price index) to find buying opportunities in short-term or long-term uptrends and then sell when the securities start to lose momentum.

Figure 4:
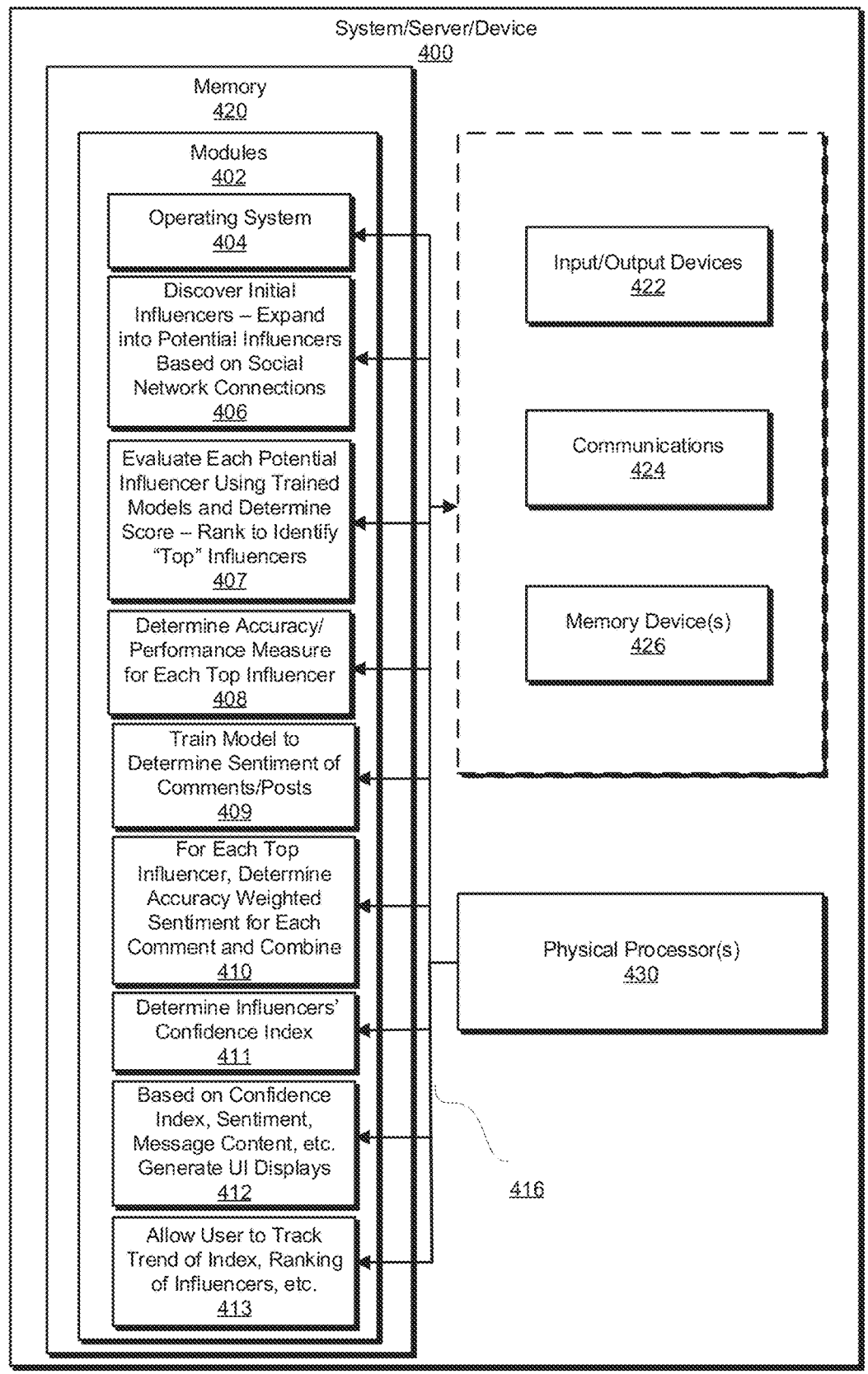
FIG. 4 is a diagram illustrating elements or components that may be present in a computer device, server, or system configured to implement a method, process, function, or operation in accordance with some embodiments.

FIG. 4 is a diagram illustrating elements or components that may be present in a computer device, server, or system 400 configured to implement a method, process, function, or operation in accordance with some embodiments. As noted, in some embodiments, the disclosed system and methods may be implemented in the form of an apparatus that includes a processing element and set of executable instructions. The executable instructions may be part of a software application and arranged into a software architecture. In general, an embodiment may be implemented using a set of software instructions that are designed to be executed by a suitably programmed processing element (such as a GPU, TPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a specific function, method, process, or operation that is implemented by the module or sub-module. Such function, method, process, or operation may include those used to implement one or more aspects of the disclosed system and methods, such as for one or more of the steps or stages illustrated and described with reference to the included Figures.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As mentioned, each module may contain a set of computer-executable instructions. The set of instructions may be executed by a programmed processor contained in a server, client device, network element, system, platform, or other component. The computer-executable instructions that are contained in the modules or in a specific module may be executed by the same processor or by different processors. Further, the computer-executable instructions that are contained in a single module may be executed (in whole or in part) by one processor or by more than one processor. A module may contain instructions that are executed by a processor contained in more than one of a server, client device, network element, system, platform, or other component. Thus, in some embodiments, a plurality of electronic processors, with each being part of a separate device, server, or system may be responsible for executing all or a portion of the software instructions contained in a module. Thus, although FIG. 4 illustrates a set of modules which taken together enable the performance of multiple functions or operations, these functions or operations may be performed in response to the execution of instructions by different devices or system elements.

As shown in the figure, system 400 may represent a server or other form of computing or data processing device. Modules 402 each contain a set of executable instructions, where when the set of instructions is executed by a suitable electronic processor (such as that indicated in the figure by "Physical Processor(s) 430"), system (or server or device) 400 operates to perform a specific process, operation, function or method. Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 416, which also permits processor(s) 430 to communicate with the modules for purposes of accessing and executing a set of instructions. Bus or communications line 416 also permits processor(s) 430 to interact with other elements of system 400, such as input or output devices 422, communications elements 424 for exchanging data and information with devices external to system 400, and additional memory devices 426 (which may include volatile memory (such as RAM) used for storing a set of instructions while the instructions are being executed and non-volatile memory used to store data and processed data).

As suggested by the Figure, modules 402 may contain one or more sets of instructions for performing a method or function described with reference to the Figures and descriptions herein. These modules may include those illustrated but may also include a greater number or fewer number than those illustrated. For example, Discover Initial Influencers—expand into Potential Influencers Based on Social Network Connections Module 406 may contain instructions that when executed perform a process to execute steps or stages 204, 206, and 208 of FIG. 2 for a specific topic or area of interest to a user. Evaluate Each Potential Influencer Using Trained Models and Determine Score—Rank to Identify "Top" Influencers Module 407 may contain instructions that when executed perform a process to execute steps or stages 212, 214, 216, 218, and 219 of FIG. 2 to determine a set of top influencers based on their expertise weighted ability to influence others.

Determine Accuracy/Performance Measure for Each Top Influencer Module 408 may contain instructions that when executed perform a process to execute steps or stages 222 of FIG. 2 to determine an accuracy or prediction performance measure for each top influencer based on the historical accuracy of their comments or posts over one or more timeframes. Train Model to Determine Sentiment of Comments/Posts Module 409 may contain instructions that when executed perform a process to execute steps or stages 232 and 234 of FIG. 2. For Each Top Influencer, Determine Accuracy Weighted Sentiment for Each Comment and Combine Module 410 may contain instructions that when executed perform a process to execute steps or stages 242 and 244 of FIG. 2 to determine an accuracy weighted sentiment measure for each of a top influencer's comments or posts, and then to combine those into an index for that influencer. Determine Influencers' Confidence Index Module 411 may contain instructions that when executed perform a process to execute steps or stages 246 of FIG. 2 to generate a metric or index representing the overall confidence the top influencers (or a subset of those) have in the behavior of a stock, industry, company, trend, etc.

Based on Confidence Index, Sentiment, Message Content, etc. Generate UI Displays Module 412 and Allow User to Track Trend of Index, Ranking of Influencers, etc. Module 413 may contain instructions that when executed perform a process to execute steps or stages 252, 254, 256, and 258 of FIG. 2 to generate one or more displays or UI elements to enable a user to view and interact with data regarding influencers, influencer content, words or topics discussed in comments or posts, etc.

Figure 5:
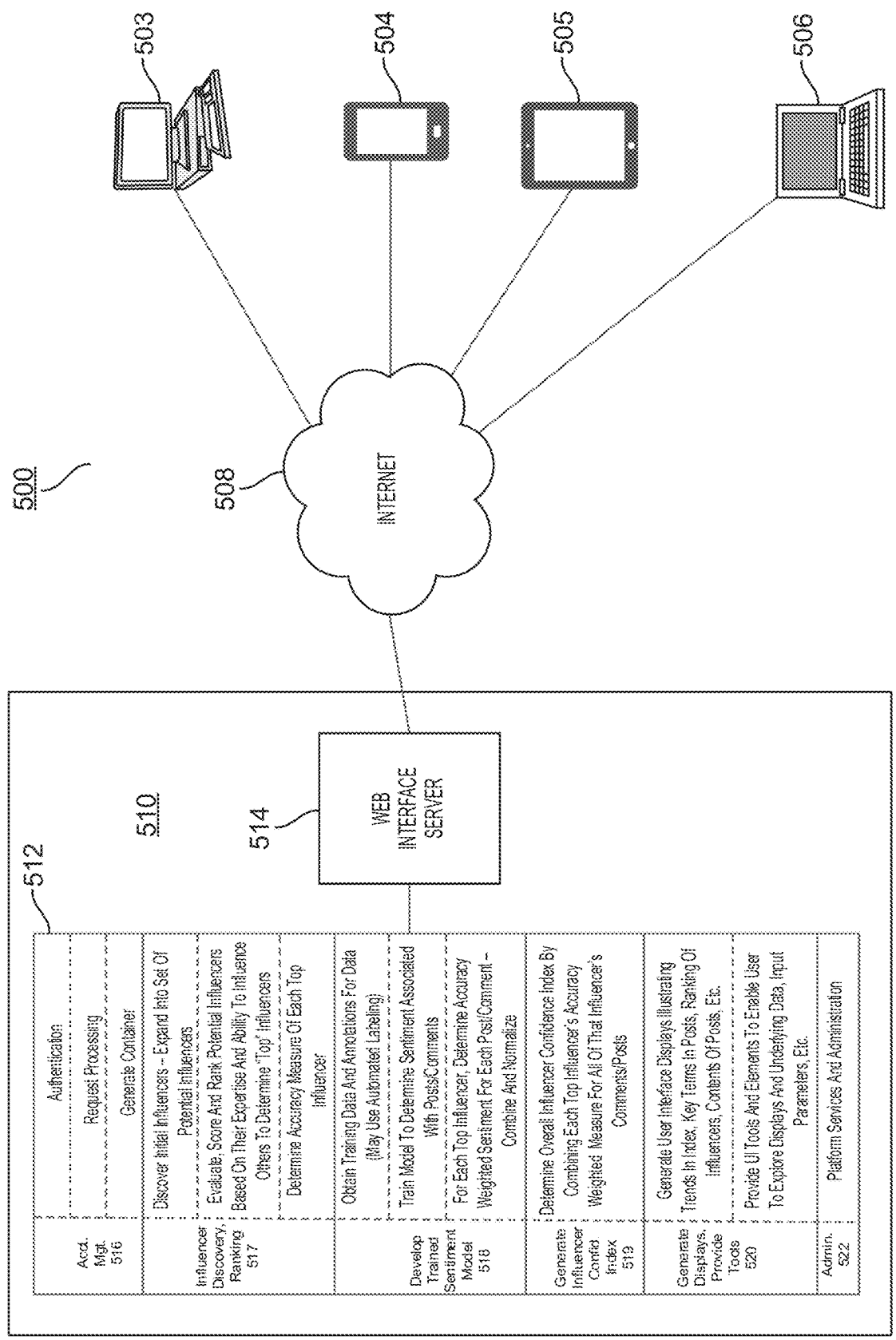
FIGS. 5-7 are diagrams illustrating an architecture for a multi-tenant or SaaS platform that may be used in implementing some embodiments of the systems and methods described herein.
Figure 6:
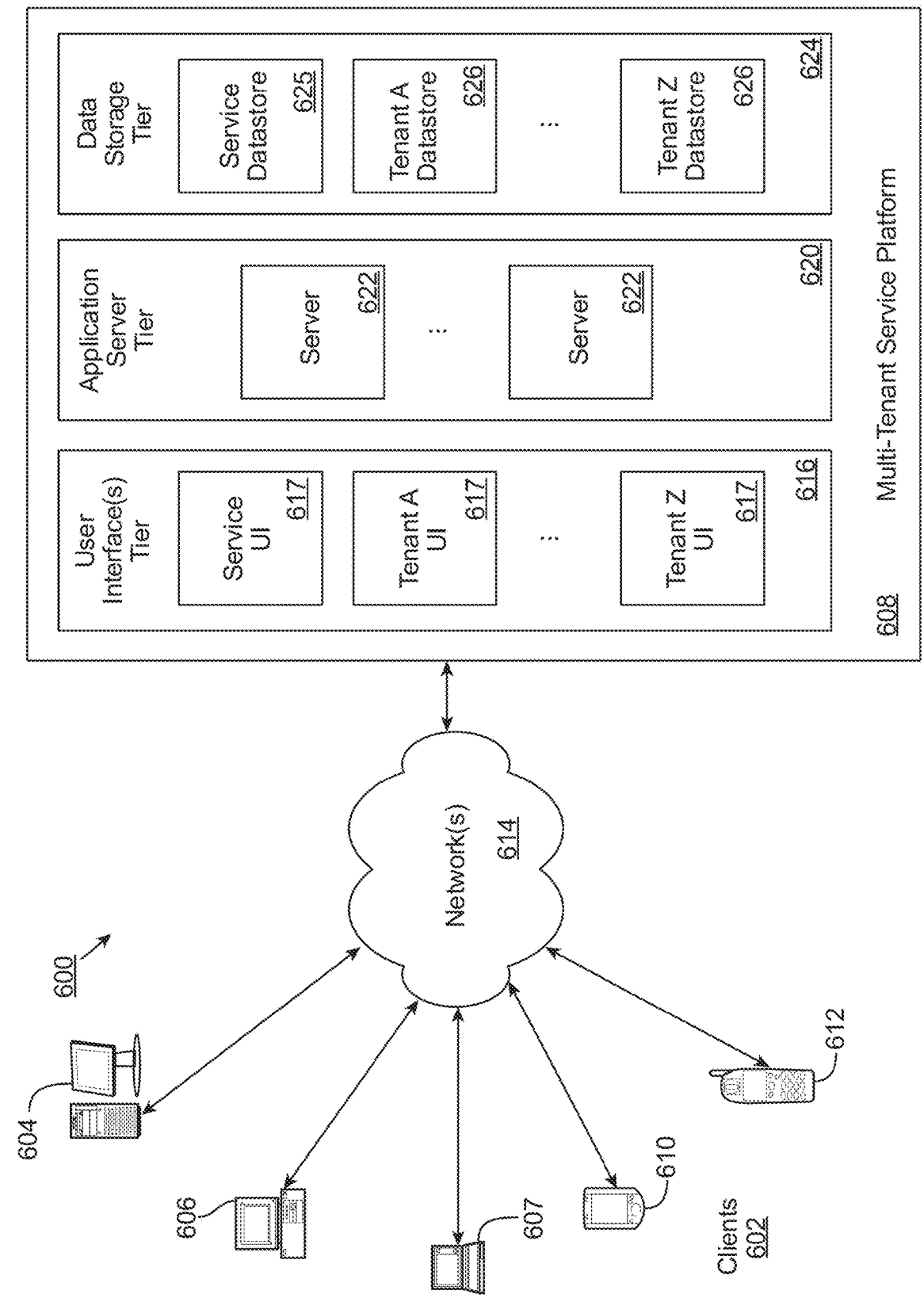
Figure 7:
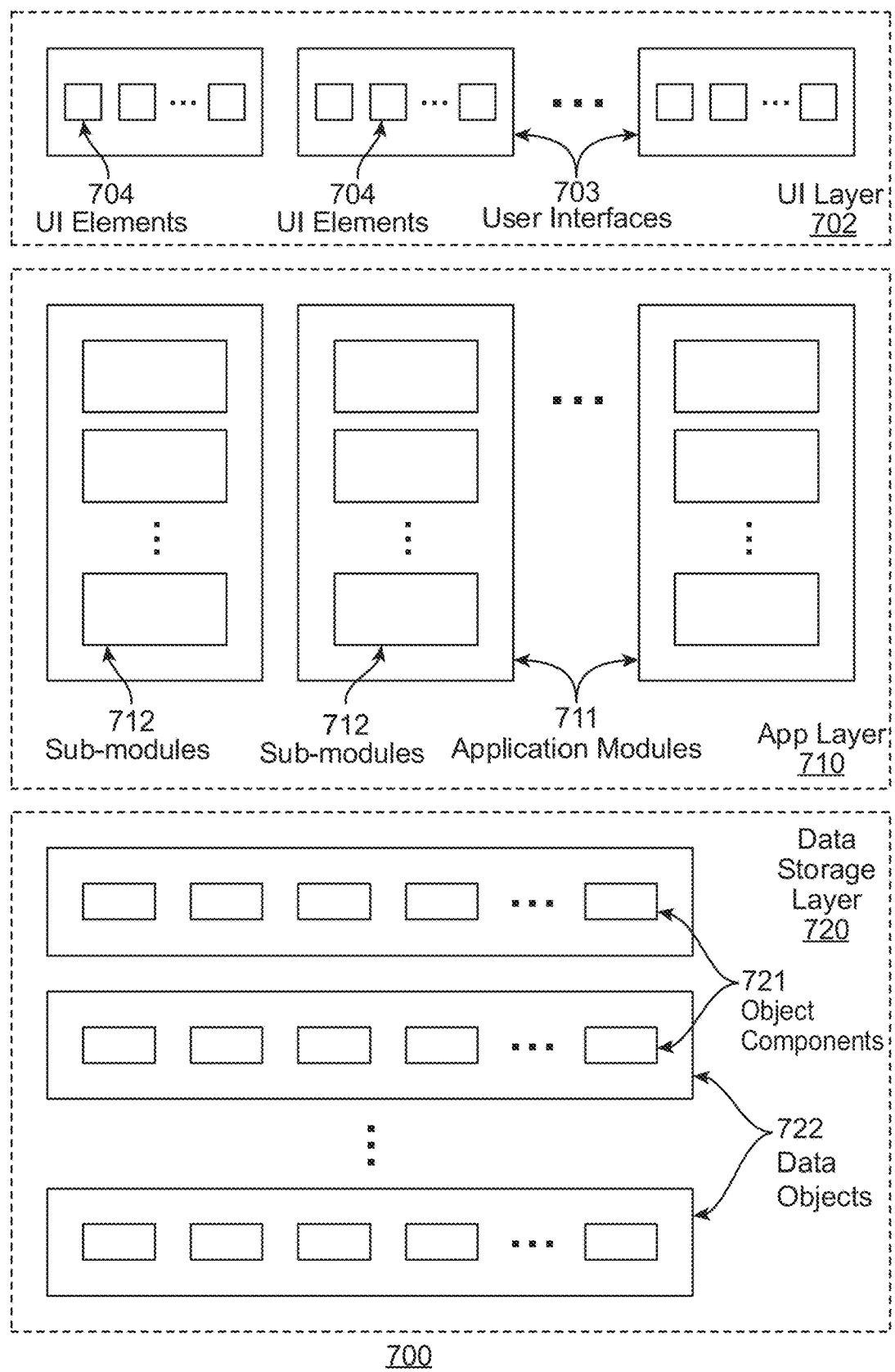

In some embodiments, the functionality and services provided by the system and methods described herein may be made available to multiple users by accessing an account maintained by a server or service platform. Such a server or service platform may be termed a form of Software-as-a-Service (SaaS). FIG. 5 is a diagram illustrating a SaaS system in which an embodiment of the disclosure may be implemented. FIG. 6 is a diagram illustrating elements or components of an example operating environment in which an embodiment of the disclosure may be implemented. FIG. 7 is a diagram illustrating additional details of the elements or components of the multi-tenant distributed computing service platform of FIG. 6, in which an embodiment of the disclosure may be implemented.

In some embodiments, the system or service(s) described herein may be implemented as micro-services, processes, workflows, or functions performed in response to a user inquiry or request. The micro-services, processes, workflows, or functions may be performed by a server, data processing element, platform, or system. In some embodiments, the services may be provided by a service platform located "in the cloud". In such embodiments, the platform is accessible through APIs and SDKs. The described influencer discovery, influencer evaluation, influencer ranking, influencer accuracy, and sentiment evaluation services, along with generating an influencer confidence index and associated displays may be provided as micro-services within the platform for each of multiple users. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 5-7 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide the data processing steps or stages for influencer discovery, influencer ranking, influencer accuracy determination, sentiment determination, and generating an influencer confidence index described herein. Although in some embodiments, a platform or system of the type illustrated in FIGS. 5-7 may be operated by a $3^{rd}$ party provider to provide a specific set of data processing applications, in other embodiments, the platform may be operated by a provider and a different business may provide the applications or services for users through the platform.

FIG. 5 is a diagram illustrating a system 500 in which an embodiment of the disclosure may be implemented or through which an embodiment of the services described herein may be accessed. In accordance with the advantages of an application service provider (ASP) hosted business service system (such as a multi-tenant data processing platform), users of the services described herein may comprise individuals, businesses, stores, organizations, etc. A user may access the services using any suitable client, including but not limited to desktop computers, laptop computers, tablet computers, scanners, smartphones, etc. In general, any client device having access to the Internet may be used to access and utilize the services and functionality described. Users interface with the service platform across the Internet 508 or another suitable communications network or combination of networks. Examples of suitable client devices include desktop computers 503, smartphones 504, tablet computers 505, or laptop computers 506.

System 510, which may be hosted by a third party, may include a set of services 512 and a web interface server 514, coupled as shown in FIG. 5. It is to be appreciated that either or both of services 512 and web interface server 514 may be implemented on one or more different hardware systems and components, even though represented as singular units in FIG. 5. Services 512 may include one or more functions or operations for performing the following:

- processing and evaluation of content obtained from traditional or social media sources to identify potential influencers;
- evaluating and ranking potential influencers to determine a set of top influencers;
- determining a measure of the accuracy of each top influencer;
- determining a sentiment associated with each comment or post published by a top influencer;
- generating an accuracy weighted sentiment measure for each comment or post and combining those to obtain a confidence index for each top influencer;
- combining the confidence index for the top influencers (or a subset of those) to generate an (overall) influencer confidence index in the behavior of a stock, industry, company, trend, etc.; and
- generating displays and a user interface to enable a user to view and interact with data regarding influencers, influencer content, confidence index trends, etc.

As examples, in some embodiments, the set of applications, functions, operations or services 512 made available through the platform or system 510 may include:

- account management services 516, such as
  - a processor service to authenticate a person requesting information regarding the confidence influencers have in a specific stock, company, industry, etc. (such as credentials or proof of purchase, verification that the customer has been authorized to use the services, etc.);
  - a process or service to receive a request for information regarding the confidence influencers have in a specific stock, company, industry, etc.;
  - a process or service to generate a container or instantiation of a set of processes for the user, where the instantiation may be customized for a particular company; and
  - other forms of account management services.

a process or service for influencer discovery and ranking 517, such as
- a process or service to discover initial influencers and expand that into a set of potential influencers;
- a process or service to evaluate, score and rank each potential influencer based on their expertise and ability to influence others;
  - as described, this may include the use of one or more trained models or other techniques to evaluate an influencer's or potential influencer's expertise, network connections, and ability to influence others, along with a model or technique to combine those measures into an overall score;
- a process or service to determine a measure of the accuracy or predictive performance of each top influencer based on their previous comments or posts;

a process or service for developing a trained sentiment model 518, such as
- a process or service that obtains training data and annotations for that data;
  - as described, this may include implementing a form of automated labeling or annotating based on the recognition of a proxy or assumed indicator of the sentiment associated with a post or comment;
- a process or service to train a model to determine the sentiment associated with a post or comment;
  - as described, this may include using a machine learning algorithm and the set of training data and associated labels to generate a trained model;
- a process or service to determine an accuracy weighted sentiment score or index associated with each top influencer's current/relevant posts or comments;
  - using the trained sentiment model, each (current) comment or post of each top influencer may be classified and associated with a score, measure, or other indicator of the sentiment associated with the post or comment;
    - in some examples, the score, measure, or other indicator may be a number between zero and one, with zero indicating a strong negative sentiment and one indicating a strong positive sentiment associated with the post or comment;
  - the accuracy weighted sentiment score or index associated with each of the top influencer's current posts or comments may be combined to generate an influencer confidence index;

a process or service for generating an overall influencer confidence index 519, such as
- a process or service to combine the influencer confidence index for each top influencer (or a subset of those) into an overall influencer confidence index;

a process or service for generating user interface displays and user tools 520, such as
- a process or service to generate one or more user interface displays illustrating trends in the overall confidence index, key terms in posts, a ranking of influencers, the contents of posts, etc.;
- a process or service to provide UI tools and elements to enable a user to explore the displays and underlying data, to input parameters, etc.; and administrative services 522, such as
- a process or service to enable the provider of the platform (or of the data processing services) to provide administrative and other services to users, such as account creation, service provision, load balancing, access to specific algorithms or models, model training data, user interface tools, etc.

The platform or system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment of the disclosure may be implemented. As shown, a variety of clients 602 incorporating and/or incorporated into a variety of computing devices may communicate with a multi-tenant service platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the message/request processing and routing described herein) are provided to users, with each company/business representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 7 is a diagram illustrating additional details of the elements or components of the multi-tenant distributed computing service platform of FIG. 6, in which an embodiment of the disclosure may be implemented. The software architecture shown in FIG. 7 represents an example of an architecture which may be used to implement an embodiment of the disclosure.

In general, an embodiment may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing business related data processing and services to a user of the platform). Such function, method, process, or operation may include those used to implement one or more aspects of the inventive system and methods, such as for one or more of the processes or functions described with reference to the Figures:

Identify one or more persons or entities that may be considered influencers with regards to the behavior of a specific item, entity, or trend;
    This may include identifying a set of potentially relevant comments or posts using keywords or other characteristics of a comment or post;
        This identification may first start with traditional media sources that are recognized to contain comments and analysis of "experts" in an area and then extend that set of experts or influencers to others;
            Extending the initial set of "experts" to other potential influencers may be done by using the recognized experts' content to provide a source for comparison with the content of others in either traditional or social media;
            This may be done by generating content embeddings for the expert's content and comparing the closeness of those embeddings to the content posted on social media;
            Extending the initial set of experts may also be done by considering the social network connections of each of the initial set or of an extended set (such as by a form of network analysis, or closeness measure);
        If necessary, to associate the identified comments or posts with a source, such as a person or entity may require further processing such as use of a named entity recognition process for social media content;
    The result of the above set of processes will be a set of potential influencers that are identified across both traditional and social media sources;
Evaluate each potential influencer's level or degree of expertise;
    This may include identifying indicia of expertise or determining that a particular person's comment or posts are using similar language and concepts to those of a recognized expert (such as an author of financial texts, policies, etc.) and are generally in agreement with those experts;
        This may be done by generating content embeddings for the expert's content and comparing the closeness of those embeddings to the content posted by another potential influencer;
    In some embodiments, this may also include evaluating the accuracy of a person's comments or posts to determine if they are correct in their "predictions" of a behavior with a sufficient frequency to be considered an "expert" or more likely to be correct;

Evaluate each potential influencer's ability to influence others;

This may include determining the extent of the social media network connections of a recognized influencer from a traditional media source and the impact of the influencer's comments or posts on others (as suggested by the response of others to the comment or post, the reposting of the comment or post, etc.);

In a sense, this is identifying a recognized expert in traditional media and then extending their sphere of influence beyond consumers of that traditional media source to social media connections of the expert or to the social media connections of those who tend to agree with the expert;

Form a score/metric representing the expertise weighted ability of a potential influencer to influencer others, and rank each potential influencer based on their expertise and ability to influence others;

Identify the top N ranked potential influencers as "top" influencers whose content will be subject to further analysis;

For each of the identified top influencers, determine the sentiment expressed by each of their relevant posts, comments, or advice;

This may include training a machine learning model to classify an input statement or group of statements with regards to whether they exhibit a positive or negative sentiment regarding an item, topic, entity, or event;

For each top influencer, determine a measure of the historical accuracy of that person's comments or posts;

In some embodiments, this may be dependent upon a timeframe, that is, a person's comments or posts may be more accurate with regards to short or near-term behavior compared to medium or longer-term behavior;

Generate an index or measure of the current confidence in the behavior of the stock, company, trend, etc. for each top influencer by forming an accuracy weighted sentiment value for each relevant comment or post and combining those;

For example, this may be an averaged or normalized sum of terms, where each term is a product of an accuracy measure (during a relevant timeframe) and a sentiment measure (for a comment or post during the same timeframe or relevant to that timeframe);

If sufficient or reliable enough accuracy related data is not available, then instead, the measure of the expertise weighted ability of a person to influence others may be used to weight the sentiment or a sum of sentiment values;

Note that the level of expertise and ability to influence others are likely connected (as it is assumed that a demonstrated expertise will enhance someone's ability to influence others) but together represent a way of approximating the weight to be given their opinion or advice as expressed in a positive or negative sentiment;

Generate an overall influencers' confidence index by forming a combination of each top influencer's current confidence index, where the overall index represents the overall confidence a set of (top) influencers have in the behavior of the company, industry, trend, fashion, item, automobile, etc.; and Generate a user interface or display enabling a user to view and interact with one or more of In some embodiments, the user interface or display may comprise the overall influencer confidence index trend for the specific example aspect or topic at different scales;

In some embodiments, the user interface or display may comprise the trending topics of posts or comments in a word cloud format;

In some embodiments, the user interface or display may comprise a list of the top influencers as ranked by user selectable criteria;

In some embodiments, the user interface or display may comprise a list of the top messages ranked by the popularity of the messages or other criteria.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further environments in which an embodiment of the disclosure may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

For example, in the context of the present application, such an architecture may be used to provide influencer discovery, scoring, and ranking services, along with services to generate an influencer confidence index and displays or user interfaces allowing a user to explore and evaluate influencers, rankings, posts or comments, sentiment, etc. through access to one or more applications or models.

The embodiments as described herein can be implemented in the form of control logic using computer software in a modular or integrated manner. Based on the disclosure and teachings provided herein, a person of ordinary skill in the art will know and appreciate other ways and/or methods to implement one or more embodiments of the disclosure using hardware and a combination of hardware and software.

In some embodiments, certain of the methods, models or functions described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform. A trained neural network, trained machine learning model, or other form of decision or classification process may be used to implement one or more of the methods, functions, processes, or operations described herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Machine learning (ML) is being used more and more to enable the analysis of data and assist in making decisions in multiple industries. In order to benefit from using machine learning, a machine learning algorithm is applied to a set of training data and labels to generate a "model" which represents what the application of the algorithm has "learned" from the training data. Each element (or example, in the form of one or more parameters, variables, characteristics or "features") of the set of training data is associated with a label or annotation that defines how the element should be classified by the trained model. A machine learning model is a set of layers of connected neurons that operate to make a decision (such as a classification) regarding a sample of input data. When trained (i.e., the weights connecting neurons have converged and become stable or within an acceptable amount of variation), the model will operate on a new element of input data to generate the correct label or classification as an output.

Any of the software components, processes or functions described in this application may be implemented as software code to be executed by a processor using any suitable computer language such as Python, Java, JavaScript, C++ or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate one or more embodiments and does not pose a limitation to the scope of the disclosure or claims. No language in the specification should be construed as indicating any non-claimed element as essential to each embodiment.

As used herein (i.e., the claims, figures, and specification), the term "or" is used inclusively to refer items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this disclosure. Accordingly, the present disclosure is not limited to the embodiments described herein or depicted in the drawings, and various embodiments and modifications can be made without departing from the scope of the claims below.

That which is claimed is:

1. A method of identifying a group of experts whose activities represent market trends associated with a domain, comprising:

generating a social media sub-network comprising nodes each representing a respective user and edges connecting the nodes, by:
receiving a plurality of postings related to an area of interest in the domain from a plurality of sources in social media, wherein each posting of the plurality of postings comprises text comprising content of the posting;
for each of the plurality of postings, extracting a user account name of a user authoring the posting from the text of the posting, by using a first trained machine learning model and the text as input to the first trained machine learning model to determine the user account name in the text, wherein the first trained machine learning model is trained to:
determine character embeddings from the text of a given posting, wherein the character embeddings comprise numeric representations of words in the text of the given posting at character-level compositions; and
determine user account name in the text of the given posting based on the character embeddings;
determining a first set of nodes corresponding respectively to users associated with the extracted user account name; and
determining a second set of nodes each representing an additional user and connecting to one or more nodes in the first set of nodes, and edges connecting the first set of nodes and the second set of nodes, wherein an edge connecting a first node and a second node indicates that content of the posting of the user associated with the first node is similar or related to content of the posting of the user associated with the second node;
forming a group of potential influencers from the first and second sets of nodes in the social media sub-network;
determining metrics representing at least a level of expertise of an individual person of the group of potential influencers, by:
using a second trained machine learning model and social media postings authored by the individual person as input to the second trained machine learning model to generate embeddings for the individual person, wherein the embeddings for the individual person quantify semantics in the domain associated with the individual person, and wherein the second trained machine learning model comprises a Bidirectional Encoder Representations from Transformers (BERT) model pretrained to consider words before and after a given word in a training text dataset; and
comparing the embeddings for the individual person with reference embeddings for known experts to determine the metrics representing at least the level of expertise of the individual person, wherein the metrics is represented by a similarity score indicative of a similarity between content of the social media postings authored by the individual person and content provided by the known experts;

based on the metrics for the group of potential influencers, identifying a group of influencers from the group of potential influencers; and
presenting market trends associated with the domain in a user interface based on the identified group of influencers and social media postings of the identified group of influencers.

2. The method of claim 1, wherein the domain comprises one or more of business, finance, fashion, sports, or current events.

3. The method of claim 1, wherein the content of the posting of the user associated with the first node of the edge is similar to the content of the posting of the user associated with the second node of the edge.

4. The method of claim 1, wherein the content of the posting of the user associated with the first node of the edge is related to the content of the posting of the user associated with the second node of the edge via mention, reply and/or comment.

5. The method of claim 1, wherein determining the metrics further comprises:
determining metrics representing the extent of the individual person's connections within the social network,
determining metrics representing the impact of the individual person's content on those in the individual person's connections within the social network, and
combining the metrics representing the level of expertise, the metrics representing the extent of the individual person's connections within the social network, and the metrics representing the impact of the individual person's content on those in the individual person's connections within the social network.

6. The method of claim 5, wherein one or more of the metrics representing the extent of the individual person's connections within the social network and metrics representing the impact of the individual person's content on those in the individual person's connections within the social network is determined using a third trained machine learning model.

7. The method of claim 1, further comprising determining a sentiment expressed by an item of content in one or more social media postings authored by an individual influencer in the group of influencers using the content and/or responses thereto in the social media network as the basis for an input to a third trained machine learning model configured to process the input to generate an indication of the sentiment associated with the input.

8. The method of claim 7, further comprising training the third trained machine learning model using a set of text and a proxy for the sentiment associated with each item of text in the set of text, wherein the proxy is correlated with a response to the item of text that follows publication of the item of text.

9. The method of claim 1, further comprising determining a measure of the historical accuracy of content authored by an individual influencer in the group of influencers further by comparing sentiment of a specific item expressed in the content authored by the individual influencer to actual behavior of the specific item over one or more timeframes.

10. The method of claim 1, further comprising generating a measure of the current confidence level in the behavior of a specific item, for an individual influencer of the group of influencers by combining an accuracy weighted sentiment value for each of a plurality of text items authored by the individual influencer.

11. A system for identifying a group of experts whose activities represent market trends associated with a domain, comprising:
a set of computer-executable instructions; and
a processor or processors, wherein when executed, the instructions cause the processor or processors to:
generate a social media sub-network comprising nodes each representing a respective user and edges connecting the nodes, by:
receiving a plurality of postings related to an area of interest in the domain from a plurality of sources in social media, wherein each posting of the plurality of postings comprises text comprising content of the posting;
for each of the plurality of postings, extracting a user account name of a user authoring the posting from the text of the posting, by using a first trained machine learning model and the text as input to the first trained machine learning model to determine the user account name in the text, wherein the first trained machine learning model is trained to:
determine character embeddings from the text of a given posting, wherein the character embeddings comprise numeric representations of words in the text of the given posting at character-level compositions; and
determine user account name in the text of the given posting based on the character embeddings;
determining a first set of nodes corresponding respectively to users associated with the extracted user account name; and
determining a second set of nodes each representing an additional user and connecting to one or more nodes in the first set of nodes, and edges connecting the first set of nodes and the second set of nodes, wherein an edge connecting a first node and a second node indicates that content of the posting of the user associated with the first node is similar or related to content of the posting of the user associated with the second node;
form a group of potential influencers from the first and second sets of nodes in the social media sub-network;
determine metrics representing at least a level of expertise of an individual person of the group of potential influencers, by:
using a second trained machine learning model and social media postings authored by the individual person as input to the second trained machine learning model to generate embeddings for the individual person, wherein the embeddings for the individual person quantify semantics in the domain associated with the individual person, and wherein the second trained machine learning model comprises a Bidirectional Encoder Representations from Transformers (BERT) model pretrained to consider words before and after a given word in a training text dataset; and
comparing the embeddings for the individual person with reference embeddings for known experts to determine the metrics representing at least the level of expertise of the individual person, wherein the metrics is represented by a similarity score indicative of a similarity between content of the social media postings authored by the individual person and content provided by the known experts;

based on the metrics for the group of potential influencers, identify a group of influencers from the group of influencers; and presenting market trends associated with the domain in a user interface based on the identified group of influencers and social media postings of the identified group of influencers.

12. The system of claim 11, wherein the domain comprises one or more of business, finance, fashion, sports, or current events.

13. The system of claim 11, wherein the content of the posting of the user associated with the first node of the edge is similar to the content of the posting of the user associated with the second node of the edge and/or the content of the posting of the user associated with the first node of the edge is related to the content of the posting of the user associated with the second node of the edge via mention, reply and/or comment.

14. The system of claim 11, further comprising instructions that cause the processor or processors to determine a sentiment expressed by an item of content in one or more social media postings authored by an individual influencer in the group of influencers using the content and/or responses thereto in the social media network as the basis for an input to a third trained machine learning model configured to process the input to generate an indication of the sentiment associated with the input.

15. The system of claim 14, further comprising instructions that cause the processor or processors to train the third trained machine learning model using a set of text and a proxy for the sentiment associated with each item of text in the set of text, wherein the proxy is correlated with a response to the item of text that follows publication of the item of text.

16. A non-transitory computer-readable medium containing a set of computer-executable instructions that when executed by one or more programmed electronic processors, cause the processors to identify a group of experts whose activities represent market trends associated with a domain, by:

generating a social media sub-network comprising nodes each representing a respective user and edges connecting the nodes, by:
  receiving a plurality of postings related to an area of interest in the domain from a plurality of sources in social media, wherein each posting of the plurality of postings comprises text comprising content of the posting;
  for each of the plurality of postings, extracting a user account name of a user authoring the posting from the text of the posting, by using a first trained machine learning model and the text as input to the first trained machine learning model to determine the user account name in the text, wherein the first trained machine learning model is trained to:
    determine character embeddings from the text of a given posting, wherein the character embeddings comprise numeric representations of words in the text of the given posting at character-level compositions; and
    determine user account name in the text of the given posting based on the character embeddings;
  determining a first set of nodes corresponding respectively to users associated with the extracted user account name; and
  determining a second set of nodes each representing an additional user and connecting to one or more nodes in the first set of nodes, and edges connecting the first set of nodes and the second set of nodes, wherein an edge connecting a first node and a second node indicates that content of the posting of the user associated with the first node is similar or related to content of the posting of the user associated with the second node;

forming a group of potential influencers from the first and second sets of nodes in the social media sub-network;

determining metrics representing at least a level of expertise of an individual person of the group of potential influencers, by;
  using a second trained machine learning model and social media postings authored by the individual person as input to the second trained machine learning model to generate embeddings for the individual person, wherein the embeddings for the individual person quantify semantics in the domain associated with the individual person, and wherein the second trained machine learning model comprises a Bidirectional Encoder Representations from Transformers (BERT) model pretrained to consider words before and after a given word in a training text dataset; and
  comparing the embeddings for the individual person with reference embeddings for known experts to determine the metrics representing at least the level of expertise of the individual person, wherein the metrics is represented by a similarity score indicative of a similarity between content of the social media postings authored by the individual person and content provided by the known experts;

based on the metrics for the group of potential influencers, identifying a group of influencers from the group of potential influencers; and presenting market trends associated with the domain in a user interface based on the identified group of influencers and social media postings of the identified group of influencers.

17. The non-transitory computer-readable medium of claim 16, wherein the content of the posting of the user associated with the first node of the edge is similar to the content of the posting of the user associated with the second node of the edge and/or the content of the posting of the user associated with the first node of the edge is related to the content of the posting of the user associated with the second node of the edge via mention, reply and/or comment.

* * * * *